(12) United States Patent
Weber et al.

(10) Patent No.: US 7,863,377 B2
(45) Date of Patent: Jan. 4, 2011

(54) THERMOPLASTIC MOLDING MATERIALS BASED ON POLYESTERS AND STYRENE COPOLYMERS

(75) Inventors: Martin Weber, Maikammer (DE); Xaver Hopfenspirger, Hobloch (DE)

(73) Assignee: BASF AG, Ludwigshafen (DE)

( * ) Notice: Subject to any disclaimer, the term of this patent is extended or adjusted under 35 U.S.C. 154(b) by 522 days.

(21) Appl. No.: 11/997,797

(22) PCT Filed: Jul. 31, 2006

(86) PCT No.: PCT/EP2006/064853
§ 371 (c)(1), (2), (4) Date: Feb. 4, 2008

(87) PCT Pub. No.: WO2007/014938
PCT Pub. Date: Feb. 8, 2007

(65) Prior Publication Data
US 2008/0227920 A1 Sep. 18, 2008

(30) Foreign Application Priority Data
Aug. 4, 2005 (DE) ........................ 10 2005 037 329

(51) Int. Cl.
C08F 265/04 (2006.01)
C08L 25/12 (2006.01)
C08L 51/04 (2006.01)
C08L 67/02 (2006.01)

(52) U.S. Cl. .............................. 525/63; 525/64; 525/65; 525/66; 525/69

(58) Field of Classification Search .................. 525/63, 525/64, 65, 66, 69
See application file for complete search history.

(56) References Cited

U.S. PATENT DOCUMENTS

| | | | |
|---|---|---|---|
| 4,352,904 A | 10/1982 | Deyrup | |
| 4,902,749 A | 2/1990 | Akkapeddi et al. | |
| 5,310,793 A | 5/1994 | Freitag et al. | |
| 6,894,112 B1 | 5/2005 | Weber et al. | |
| 2005/0159546 A1 | 7/2005 | Weber et al. | |

FOREIGN PATENT DOCUMENTS

| | | |
|---|---|---|
| DE | 2758497 | 7/1978 |
| DE | 19845317 | 4/2000 |
| EP | 284086 | 9/1988 |
| EP | 573680 | 12/1993 |
| GB | 1552090 | 9/1979 |
| WO | WO-0138436 | 5/2001 |
| WO | WO-03085047 | 10/2003 |
| WO | WO-2004055107 | 7/2004 |

OTHER PUBLICATIONS

P. Lee et al., In situ Compatibilization of PBT/ABS Blends Through Reactive Copolymers, Polymer, vol. 35, pp. 5641-5650, 1994.
E. Hage, Inpact Modification of Poly(butylene terephthalate) By ABS Materials Polymer, vol. 38, pp. 3237-3250, 1997.

*Primary Examiner*—Jeffrey C Mullis
(74) *Attorney, Agent, or Firm*—Connolly Bove Lodge & Hutz LLP

(57) ABSTRACT

Thermoplastic molding compositions, comprising
A) at least one thermoplastic polyester A,
B) at least one graft polymer B of
  b1) a graft base of an elastomeric polymer B1 based on alkyl acrylates, ethylene/propylene, dienes, or on siloxanes, and with a glass transition temperature below 0° C.,
  b2) a graft B2 composed of
  b21) styrene or of substituted styrenes B21 of formula I

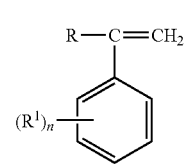

where R is alkyl or hydrogen and $R^1$ is alkyl radical and n is 1, 2, or 3, or mixture, and
  b22) at least one unsaturated nitrile B22,
C) at least one thermoplastic copolymer C of
  c1) styrene and/or of substituted styrenes C1 of formula I, and
  c2) at least one unsaturated nitrile C2,
D) at least one copolymer D, obtainable via reaction of
  d1) at least one thermoplastic methacrylate polymer D1 comprising at least one of epoxy, carboxy, hydroxy, anhydride, or oxazoline, with
  d2) at least one thermoplastic polyester D2.

20 Claims, No Drawings

THERMOPLASTIC MOLDING MATERIALS BASED ON POLYESTERS AND STYRENE COPOLYMERS

CROSS REFERENCE TO RELATED APPLICATIONS

This application is a National Phase filing under 35 U.S.C. §371 of PCT/EP2006/064853 filed Jul. 31, 2006, which claims priority to Patent Application No. 102005037329.1, filed in Germany on Aug. 4, 2005. The entire contents of each of the above-applications are incorporated herein by reference.

The invention relates to thermoplastic molding compositions, comprising
A) from 10 to 97.5% by weight of at least one thermoplastic polyester A,
B) from 1 to 97.5% by weight of at least one graft polymer B composed of
  b1) from 40 to 80% by weight of a graft base composed of an elastomeric polymer B1 based on alkyl acrylates having from 1 to 8 carbon atoms in the alkyl radical, on ethylene/propylene, on dienes, or on siloxanes, and with a glass transition temperature below 0° C.,
  b2) from 20 to 60% by weight of a graft B2 composed of
    b21) from 60 to 95% by weight of styrene or of substituted styrenes B21 of the general formula I

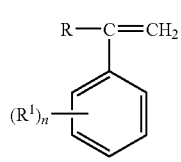

where R is a $C_{1-8}$-alkyl radical or hydrogen and $R^1$ is a $C_{1-8}$-alkyl radical and n is 1, 2, or 3, or a mixture of these, and
    b22) from 5 to 40% by weight of at least one unsaturated nitrile B22,
C) from 1 to 97.5% by weight of at least one thermoplastic copolymer C composed of
  c1) from 60 to 85% by weight of styrene or of substituted styrenes C1 of the general formula I, or a mixture thereof, and
  c2) from 15 to 40% by weight of at least one unsaturated nitrile C2,
D) from 0.5 to 50% by weight of at least one copolymer D, obtainable via reaction of
  d1) from 5 to 95% by weight of at least one thermoplastic methacrylate polymer D1 comprising at least one type of functional groups, selected from epoxy, carboxy, hydroxy, anhydride, and oxazoline, with
  d2) from 5 to 95% by weight of at least one thermoplastic polyester D2,
E) from 0 to 40% by weight of at least one filler E,
F) from 0 to 2% by weight of at least one organic acid F,
G) from 0 to 25% by weight of at least one halogen-free phosphorus compound G,
H) from 0 to 45% by weight of other additives H, where the entirety of components A to H always gives 100%.

The invention further relates to the use of the inventive thermoplastic molding compositions for production of fibers, foils, and moldings, and also to the resultant moldings of any type.

Polymer blends composed of polyesters and of styrene copolymers, such as ABS (acrylonitrile-butadiene-styrene polymers) or ASA (acrylonitrile-styrene-acrylate polymers), have been known for a long time (DE-A 27 58 497, DE-A 19 845 317). These products have better dimensional stability than polyesters, and these molding compositions are therefore used especially in the automobile sector.

The toughness of these products is unsatisfactory because of incompatibility between the components.

The literature therefore discloses various approaches to improving the compatibility of the phases, and materials especially used here are functionalized styrene copolymers (EP-A 284 086, U.S. Pat. No. 4,902,749, U.S. Pat. No. 5,310,793, Lee P.-C., Kuo W.-F., Chang F.-C., Polymer 1994, 35, 5641) and reactive acrylate copolymers (EP-A 573 680, U.S. Pat. No. 4,352,904, Hage E., Hale W., Keskkula, Paul D. R., Polymer, 1997, 38, 3237).

By way of example, F.-C. Chang et. al (Polymer 35, 5641, 1994) describes a method of compatibilizing PBT and ABS. SAN-GMA terpolymers are used as reactive modifiers here. However, the rise in toughness is obtained at the cost of a significant reduction in flowability.

WO 04/55107 discloses molding compositions based on polycondensates and on styrene copolymers, these comprising a polyisocyanate alongside SAN-MA terpolymers. These molding compositions exhibit improved toughness but have disadvantages in melt stability.

It was therefore an object of the present invention to provide molding compositions which are based on polyesters and on styrene copolymers and which have not only good toughness but also good flowability and processability.

Accordingly, the molding compositions defined at the outset have been found. Preferred embodiments are given in the subclaims.

Surprisingly, it has been found that reaction products derived from reactive PMMA and from polyesters, give in polyester/styrene copolymer blends, not only an improvement in toughness but also good processability (flowability, melt stability).

The inventive molding compositions comprise, as component (A), from 10 to 97=5% by weight, preferably from 10 to 93% by weight, and in particular from 20 to 89.5% by weight, of at least one thermoplastic polyester.

The polyesters A) used are generally those based on aromatic dicarboxylic acids and on an aliphatic or aromatic dihydroxy compound.

A first group of preferred polyesters is that of polyalkylene terephthalates, in particular those having from 2 to 10 carbon atoms in the alcohol moiety.

Polyalkylene terephthalates of this type are known per se and are described in the literature. Their main chain comprises an aromatic ring which derives from the aromatic dicarboxylic acid. There may also be substitution in the aromatic ring, e.g. by halogen, such as chlorine or bromine, or by $C_1$-$C_4$-alkyl, such as methyl, ethyl, iso- or n-propyl, or n-, iso- or tert-butyl.

These polyalkylene terephthalates may be prepared by reacting aromatic dicarboxylic acids, or their esters or other ester-forming derivatives, with aliphatic dihydroxy compounds in a manner known per se.

Preferred dicarboxylic acids are 2,6-naphthalenedicarboxylic acid, terephthalic acid and isophthalic acid, and mixtures of these. Up to 30 mol %, preferably not more than 10 mol %, of the aromatic dicarboxylic acids may be replaced by aliphatic or cycloaliphatic dicarboxylic acids, such as adipic acid, azelaic acid, sebacic acid, dodecanedioic acids and cyclohexanedicarboxylic acids.

Preferred aliphatic dihydroxy compounds are diols having from 2 to 6 carbon atoms, in particular 1,2-ethanediol, 1,3-propanediol, 1,4-butanediol, 1,6-hexanediol, 1,4-hexanediol, 1,4-cyclohexanediol, 1,4-cyclohexanedimethanol and neopentyl glycol, and mixtures of these.

Particularly preferred polyesters (A) are polyalkylene terephthalates derived from alkanediols having from 2 to 6 carbon atoms. Among these, particular preference is given to polyethylene terephthalate, polypropylene terephthalate and polybutylene terephthalate, and mixtures of these. Preference is also given to PET and/or PBT which comprise, as other monomer units, up to 1% by weight, preferably up to 0.75% by weight, of 1,6-hexanediol and/or 2-methyl-1,5-pentanediol.

The viscosity number of the polyesters (A) is generally in the range from 50 to 220, preferably from 80 to 160 measured in 0.5% strength by weight solution in a phenol/o-dichlorobenzene mixture (in a weight ratio of 1:1) at 25° C. in accordance with ISO 1628.

Particular preference is given to polyesters whose carboxyl end group content is up to 100 mval/kg of polyester, preferably up to 50 mval/kg of polyester and in particular up to 40 mval/kg of polyester. Polyesters of this type may be prepared, for example, by the process of DE-A 44 01 055. The carboxyl end group content is usually determined by titration methods (e.g. potentiometry).

Particularly preferred molding compositions comprise, as component A), a mixture of polyesters other than PBT, for example polyethylene terephthalate (PET). The proportion of the polyethylene terephthalate, for example, in the mixture is preferably up to 50% by weight, in particular from 10 to 35% by weight, based on 100% by weight of A).

It is also advantageous to use recycled PET materials (also termed scrap PET), if appropriate mixed with polyalkylene terephthalates, such as PBT.

Recycled materials are generally:
1) those known as post-industrial recycled materials: these are production wastes during polycondensation or during processing, e.g. sprues from injection molding, start-up material from injection molding or extrusion, or edge trims from extruded sheets or films.
2) post-consumer recycled materials: these are plastic items which are collected and treated after utilization by the end consumer. Blow-molded PET bottles for mineral water, soft drinks and juices are easily the predominant items in terms of quantity.

Both types of recycled material may be used either as ground material or in the form of pellets. In the latter case, the crude recycled materials are separated and purified and then melted and pelletized using an extruder. This usually facilitates handling and free flow, and metering for further steps in processing.

The recycled materials used may either be pelletized or in the form of regrind. The edge length should not be more than 10 mm, preferably less than 8 mm.

Because polyesters undergo hydrolytic cleavage during processing (due to traces of moisture) it is advisable to predry the recycled material. The residual moisture content after drying is preferably <0.2%, in particular <0.05%.

Another group to be mentioned is that of fully aromatic polyesters derived from aromatic dicarboxylic acids and aromatic dihydroxy compounds.

Suitable aromatic dicarboxylic acids are the compounds previously described for the polyalkylene terephthalates. The mixtures preferably used are composed of from 5 to 100 mol % of isophthalic acid and from 0 to 95 mol % of terephthalic acid, in particular from about 80% of terephthalic acid with 20% of isophthalic acid up to approximately equivalent mixtures of these two acids.

The aromatic dihydroxy compounds preferably have the formula

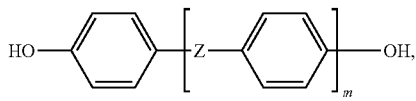

where Z is an alkylene or cycloalkylene group having up to 8 carbon atoms, an arylene group having up to 12 carbon atoms, a carbonyl group, a sulfonyl group, oxygen or sulfur, or a chemical bond, and m is from 0 to 2. The phenylene groups of the compounds may also have substitution by $C_1$-$C_6$-alkyl or alkoxy groups and fluorine, chlorine or bromine.

Examples of parent compounds for these compounds are dihydroxybiphenyl, di(hydroxyphenyl)alkane, di(hydroxyphenyl)cycloalkane, di(hydroxyphenyl)sulfide, di(hydroxyphenyl)ether, di(hydroxyphenyl)ketone, di(hydroxyphenyl)sulfoxide, α,α'-di(hydroxyphenyl)dialkylbenzene, di(hydroxyphenyl)sulfone, di(hydroxybenzoyl)benzene, resorcinol, and hydroquinone, and also the ring-alkylated and ring-halogenated derivatives of these.

Among these, preference is given to
4,4'-dihydroxybiphenyl,
2,4-di(4'-hydroxyphenyl)-2-methylbutane,
α,α'-di(4-hydroxyphenyl)-p-diisopropylbenzene,
2,2-di(3'-methyl-4'-hydroxyphenyl)propane, and
2,2-di(3'-chloro-4'-hydroxyphenyl)propane, and in particular to
2,2-di(4'-hydroxyphenyl)propane,
2,2-di(3',5-dichlorodihydroxyphenyl)propane,
1,1-di(4'-hydroxyphenyl)cyclohexane,
3,4'-dihydroxybenzophenone,
4,4'-dihydroxydiphenyl sulfone and
2,2-di(3',5'-dimethyl-4'-hydroxyphenyl)propane and mixtures of these.

It is, of course, also possible to use mixtures of polyalkylene terephthalates and fully aromatic polyesters. These generally comprise from 20 to 98% by weight of the polyalkylene terephthalate and from 2 to 80% by weight of the fully aromatic polyester.

It is, of course, also possible to use polyester block copolymers, such as copolyetheresters. Products of this type are known per se and are described in the literature, e.g. in U.S. Pat. No. 3,651,014. Corresponding products are also available commercially, e.g. Hytrel® (DuPont).

Amounts of from 1 to 97.5% by weight, based on the entirety of components A) to H), of a graft copolymer, or of a mixture of different graft copolymers, are used as component B) in the inventive molding compositions. Preferred inventive molding compositions comprise from 3 to 50% by weight, particularly preferably from 2 to 25% by weight, of at least one graft copolymer B, based on the entirety of components A) to H).

The graft polymers B are composed of $b_1$) from 40 to 80% by weight, preferably from 50 to 70% by weight, of a graft base composed of an elastomeric polymer based on alkyl acrylates having from 1 to 8 carbon atoms in the alkyl radical and with a glass transition temperature below 0° C.

$b_2$) from 20 to 60% by weight, preferably from 30 to 50% by weight, of a graft composed of $b_{21}$) from 60 to 95% by weight, preferably from 70 to 85% by weight, of styrene or of substituted styrenes of the general formula I

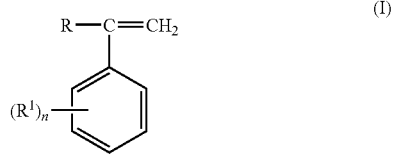

(I)

where R is a $C_1$-$C_8$-alkyl radical, preferably methyl or ethyl, or hydrogen and $R^1$ is a $C_1$-$C_8$-alkyl radical, preferably methyl or ethyl, and n is 1, 2, or 3, or a mixture of these, and $b_{22}$) from 5 to 40% by weight, preferably from 15 to 30% by weight, of at least one unsaturated nitrile, preferably acrylonitrile or methacrylonitrile, or a mixture of these.

Polymers which may be used for the graft base $b_1$ are those whose glass transition temperature is below 10° C., preferably below 0° C., particularly preferably below −20° C. Examples of these are elastomers based on $C_1$-$C_8$-alkyl esters of acrylic acid, which, if appropriate, may comprise other comonomers.

Preferred graft bases $b_1$ are those composed of $b_{11}$) from 70 to 99.9% by weight, preferably 99% by weight, of at least one alkyl acrylate having from 1 to 8 carbon atoms in the alkyl radical, preferably n-butyl acrylate and/or 2-ethylhexyl acrylate, in particular n-butyl acrylate as sole alkyl acrylate $b_{12}$) from 0 to 30% by weight, in particular from 20 to 30% by weight, of another copolymerizable monoethylenically unsaturated monomer, e.g. butadiene, isoprene, styrene, acrylonitrile, methyl methacrylate, or vinyl methyl ether, or a mixture of these $b_{13}$) from 0.1 to 5% by weight, preferably from 1 to 4% by weight, of a copolymerizable, polyfunctional, preferably bi- or trifunctional, monomer which brings about crosslinking.

Suitable bi- or polyfunctional crosslinking monomers $b_{13}$) here are those which preferably comprise two, or if appropriate three or more, ethylenic double bonds capable of copolymerization and not conjugated in 1,3-positions. Examples of suitable crosslinking monomers are divinylbenzene, diallyl maleate, diallyl fumarate, diallyl phthalate, triallyl cyanurate, or triallyl isocyanurate. The acrylic ester of tricyclodecenyl alcohol has proven to be a particularly advantageous crosslinking monomer (cf. DE-A 12 60 135).

This type of graft base is known per se and described in the literature, e.g. in DE-A 31 49 358.

Among the grafts $b_2$, preference is given to those in which $b_{21}$ is styrene or α-methyl-styrene or a mixture of these, and in which $b_{22}$ is acrylonitrile or methacrylonitrile. Preferred monomer mixtures used are especially styrene and acrylonitrile or α-methyl-styrene and acrylonitrile. The grafts are obtainable via copolymerization of components $b_{21}$ and $b_{22}$.

The graft base $b_1$ of the graft polymer B is composed of the components $b_{11}$, if appropriate $b_{12}$, and $b_{13}$, and is also termed ASA rubber. Its preparation is known per se and is described by way of example in DE-A 28 26 925, DE-A 31 49 358, and DE-A 34 14 118.

The graft polymers B may be prepared by the method described in DE-C 12 60 135, for example.

The construction of the graft (graft shell) of the graft polymers may involve one or two stages.

In the case of single-stage construction of the graft shell, a mixture of the monomers $b_{21}$ and $b_{22}$ in the desired ratio by weight in the range from 95:5 to 50:50, preferably from 90:10 to 65:35, is polymerized in the presence of the elastomer $b_1$, in a manner known per se (cf., for example, DE-A 28 26 925), preferably in emulsion.

In the case of two-stage construction of the graft shell $b_2$, the 1st stage generally makes up from 20 to 70% by weight, preferably from 25 to 50% by weight, based on $b_2$. Its preparation preferably uses only styrene or substituted styrenes, or a mixture of these ($b_{21}$).

The 2nd stage of the graft shell generally makes up from 30 to 80% by weight, in particular from 50 to 75% by weight, based in each case on $b_2$. Its preparation uses mixtures composed of the monomers $b_{21}$ and of the nitrites $b_{22}$, in a $b_{21}/b_{22}$ ratio by weight which is generally from 90:10 to 60:40, in particular from 80:20 to 70:30.

The selection of the conditions for the graft polymerization process is preferably such that the particle sizes obtained are from 50 to 700 nm ($d_{50}$ value from the cumulative weight distribution). Measures for this purpose are known and are described by way of example in DE-A 28 26 925.

The seed latex process can be used directly to prepare a coarse-particle rubber dispersion.

In order to obtain products of maximum toughness, it is often advantageous to use a mixture of at least two graft polymers with different particle size.

To achieve this, the particles of the rubber are enlarged in a known manner, e.g. via agglomeration, thus giving the latex a bimodal composition (from 50 to 180 nm and from 200 to 700 nm).

One preferred embodiment uses a mixture composed of two graft polymers with particle diameters ($d_{50}$ value from the cumulative weight distribution) of from 50 to 180 nm and, respectively, from 200 to 700 nm, in a ratio of from 70:30 to 30:70 by weight.

The chemical structure of the two graft polymers is preferably identical, but the shell of the coarse-particle graft polymer may in particular also be constructed in two stages.

The inventive molding compositions comprise, as component C), from 1 to 97.5% by weight, based on the entirety of components A) to H), of at least one copolymer based on styrene or on substituted styrenes, and on unsaturated nitrites. Preferred inventive molding compositions comprise proportions of from 3 to 50% by weight, in particular from 6 to 35% by weight, of component C), based on the entirety of components A) to H).

According to the invention, the copolymers C are composed of c1) from 60 to 95% by weight, preferably from 70 to 85% by weight, of styrene or of substituted styrenes of the general formula I, or a mixture of these, and c2) from 5 to 40% by weight, preferably from 15 to 30% by weight, of at least one unsaturated nitrile, preferably acrylonitrile or methacrylonitrile or a mixture of these.

The copolymers C are resin-like, thermoplastic, and rubber-free. Particularly preferred copolymers C are those composed of styrene and acrylonitrile, of o-methylstyrene and acrylonitrile, or of styrene, α-methylstyrene, and acrylonitrile. It is also possible to make simultaneous use of two or more of the copolymers described.

These copolymers are often produced as by-products in the graft polymerization reaction to prepare component B, particularly if large amounts of monomers are grafted onto small amounts of rubber.

The copolymers C are known per se and may be prepared via free-radical polymerization, in particular via emulsion, suspension, solution, or bulk polymerization. They have viscosity numbers in the range from 40 to 160 ml/g, corresponding to average molar masses $M_w$ (weight-average) of from 40 000 to 2 000 000 g/mol.

The amount of component D) present in the inventive molding compositions is from 0.5 to 50% by weight, preferably from 1 to 30% by weight, and in particular from 1.5 to 25% by weight. This is a copolymer obtainable via reaction of d1) from 5 to 95% by weight, preferably from 10 to 90% by weight and particularly preferably from 15 to 85% by weight, of at least one thermoplastic methacrylate polymer D1 comprising at least one type of functional groups selected from epoxy, carboxy, hydroxy, anhydride and oxazoline, with d2) from 5 to 95% by weight, preferably from 10 to 90% by weight and particularly preferably from 15 to 85% by weight, of at least one thermoplastic polyester D2, where the entirety of d1) and d2) gives 100% by weight.

The methacrylate monomers present in the thermoplastic methacrylate polymer D1 are preferably methyl methacrylate (MMA) or acrylates, or a mixture of these. MMA is particularly preferred.

The methacrylate polymer D1 is particularly preferably composed of d11) from 80 to 99.9% by weight, preferably from 85 to 99.3% by weight and in particular from 90 to 98.9% by weight, of MMA (component D11), d12) from 0 to 19.9% by weight, preferably from 0.5 to 14.8% by weight and in particular from 0.6 to 9.5% by weight, of at least one other acrylate or methacrylate D12, and d13) from 0.1 to 20% by weight, preferably from 0.2 to 15% by weight and in particular from 0.5 to 10% by weight, of at least one monomer D13 comprising at least one type of functional groups selected from epoxy, carboxy, hydroxy, anhydride and oxazoline, where the entirety of d11), d12) and d13) gives 100% by weight.

The methacrylate polymer D1 therefore comprises functional groups. When MMA is used as methacrylate monomer the term "reactive polymethyl methacrylate" ("reactive PMMA") is used. From the above it is apparent that the functional groups are preferably introduced into the polymer D1 via concomitant use of appropriate "reactive" monomers D13 which comprise these groups, during the polymerization of the methacrylate monomers to give the polymer D1.

Examples of other arylates or methacrylates D12 which may be used concomitantly as comonomers are $C_1$-$C_{16}$-alkyl acrylates or $C_2$-$C_{16}$-alkyl methacrylates, e.g. methyl acrylate, ethyl acrylate, n-propyl acrylate, isopropyl acrylate, n-butyl acrylate, isobutyl acrylate, tert-butyl acrylate, n-hexyl acrylate, cyclohexyl acrylate, dodecyl acrylate, ethyl methylacrylate, n-propyl methylacrylate, isopropyl methylacrylate, n-butyl methylacrylate, tert-butyl methylacrylate, n-hexyl methylacrylate, cyclohexyl methylacrylate or dodecyl methacrylate.

By way of example, reactive monomers D13 which may be used are:

for the epoxy group: glycidyl methacrylate, isopropenyl glycidyl ether, allyl glycidyl ether, preferably glycidyl methacrylate;

for the carboxy group: acrylic acid, methacrylic acid, preferably acrylic acid;

for the hydroxy group: hydroxyalkyl acrylates, hydroxyalkyl methacrylates, preferably hydroxyethylhexyl acrylate;

for the anhydride group: carboxylic anhydrides, such as maleic anhydride;

for the oxazoline group: vinyl oxazoline, isopropenyl oxazoline, preferably vinyl oxazoline.

If the methacrylate polymer D1 is intended to comprise various types of functional groups, use may be made of two or more reactive monomers D13.

In the polymers D1, the monomer units D11, D13, and also, if appropriate, D12 may have random distribution or have a blocked structure or tapered structure (where tapered means a gradient from D11-rich (D13-poor) toward D11-poor (D13-rich) or vice versa).

The average molar masses $M_w$ (weight-average) of the polymers D1 is usually from 30 000 to 500 000 g/mol, preferably from 40 000 to 450 000 g/mol, in particular from 45 000 to 300 000 g/mol.

The polymers D1 are prepared by known methods, e.g. via free-radical, group-transfer or anionic polymerization.

Free-radical polymerization is known and may by way of example take the form of a bulk, solution or bead polymerization. By way of example, it is described in the specifications NL-A 6605289, DE-A 12 31 013, DE-A 12 98 272, DE-A 36 31 826, JP-A 85/147417 and EP-A 457 147. Free-radical polymerization generally gives a rather broad molar mass distribution (weight-average/number-average ratio $M_w/M_n \geq 2$). Further details may also be found in Vieweg/Esser, Kunststoff-Handbuch, volume 9 "Polymethacrylate" (Polymethacrylates), Hanser-Verlag Munich 1975.

In contrast, anionic polymerization gives a rather narrow molar mass distribution ($M_w/M_n \leq 2$). Detailed descriptions of anionic polymerization are found, inter alia, in M. Swarcz, M. van Beylen: "Ionic Polymerization and Living Polymers", Chapman & Hall, New York, London 1993, pp. 120-130; M. Morton "Anionic Polymerization: Principles and Practice", Academic Press, New York, London, 1983, pp. 23-27; T. P. Davis, D. M. Haddleton and S. N. Richards, J. Macromol. Sci.—Rev. Macromol. Chem. Phys., C34, 243 (1994) and P. Teyssie, P. Bayard, R. Jerome, K. Varshney, J.-S. Wang, P. Heim and B. Vuillemin, Macromol. Symp., 98, 171 (1995). Another possible method is living-anionic polymerization of the monomers D11-D13 in the presence of polar aprotic solvents (in particular THF), using alkyllithium compounds as initiator at temperatures of from −120 and +20° C., preference being given to the range from −100 to −20° C.

Suitable thermoplastic polyesters D2 are those listed above under component A). It is possible to use different polyesters D2) and A), but it is preferable to use identical polyesters D2) and A).

The degree of conversion of component D) (quotient calculated from D1 reacted: D1 used) is preferably from 15 to 100%, with preference from 20 to 80%, and in particular from 25 to 75%. This is usually determined via $CH_2CO_2$ extraction:

About 5 g of pellets are suspended in 150 ml of $CH_2Cl_2$ and shaken at room temperature for 24 h. The soluble content is then isolated and determined quantitatively after removal of the solvent in vacuo. The soluble content represents unconverted D1.

The reaction of the methacrylate polymer D1 with the polyester D2 takes place either in advance, via separate reaction of D1 and D2 with one another and mixing of the resultant copolymer D with the other components A to C and, if appropriate, E to H to give a thermoplastic molding composition, or in situ during preparation of the molding compositions, by addition of D1 and D2 to the other components of the molding composition, formation of the copolymer D therefore being delayed until the molding composition is blended.

In the case of the separate reaction in advance, the preferred method of carrying out the reaction mixes the starting materials D1 and D2, with melting, and keeps the mixture molten for a certain time, with mixing if required, (this time being sufficient for the chemical reaction between D1 and D2 to proceed).

In the case of the separate reaction, it is preferable to react D1 and D2 in a melt-mixing assembly. Examples of these melt-mixing assemblies are screw kneaders, such as single-screw kneaders (e.g. co-kneaders, single-screw extruders, in particular with mixing sections and shearing sections), twin-screw kneaders (e.g. ZSK or ZE twin-screw extruders, Kombiplast extruders, MPC twin-screw kneaders mixers, FCM two-stage mixers, KEX kneading screw extruders, and shear-roll extruders). Kneaders with or without a ram are also suitable, as are trough kneaders, and Banbury mixers. The person skilled in the art will find details by way of example in Saechtling (ed.), Kunststoff-Taschenbuch [Plastics Handbook], 27th edition, Carl Hanser Verlag Munich 1998, pp. 202-211.

The copolymer D is particularly preferably obtained via melt compounding of the methacrylate polymer D1 with the polyester D2.

D1 and D2 are usually reacted at temperatures of from 230 to 300° C., preferably from 235 to 295° C., and in particular from 240 to 290° C. When melt-mixing assemblies are used, the abovementioned temperatures are the temperatures of the mixing assemblies (extruders, kneaders, etc.).

The reaction times—in the case of melt-mixing assemblies the residence times—are generally from 0.5 to 30 min, preferably from 0.75 to 20 min, and in particular from 1 to 10 min. Once the reaction has taken place a known method is generally used for discharge of the melt, the melt being cooled and pelletized.

In another embodiment, the separate reaction of D1 with D2 to give the copolymer D takes place via dissolution or swelling of the starting materials D1 and D2 in suitable solvents or swelling agents, and bringing the resultant solutions or swollen substances into contact. By way of example, the solutions can be mixed at temperatures of from 10 to 200° C.

Examples of suitable solvents for the methacrylate polymer D1 and for the polyester D2 are halogenated alcohols, such as hexafluoroisopropanol (HFIP). The solvents are usually removed after the reaction has taken place, for example removed by means of a vented extruder.

In the case of reaction in situ, the starting materials methacrylate polymer D1 and polyester D2 are mixed in the usual way with the components A to C and, if appropriate, E to H, as described at a later stage below under "Preparation of molding compositions", whereupon the copolymer D is formed.

The amount of component E) present in the inventive molding compositions is from 0 to 50% by weight, preferably from 0 to 45% by weight, in particular from 1 to 40% by weight.

Component E is fillers (also termed reinforcing materials). In particular, particulate mineral fillers and fibrous fillers may be used. Particulate mineral fillers may be used alone, or fibrous fillers may be used alone.

The proportion of the minerals in the mixtures is preferably from 5 to 95% by weight and in particular from 5 to 90% by weight, and the proportion of the fibers is preferably from 5 to 95% by weight and in particular from 10 to 95% by weight, based on component E.

Suitable particulate mineral fillers are amorphous silica, carbonates, such as magnesium carbonate (chalk), powdered quartz, mica, a very wide variety of silicates, such as clays, muscovite, biotite, suzoite, tin maletite, talc, chlorite, phlogopite, feldspar, calcium silicates, such as wollastonite, or kaolin, particularly calcined kaolin.

In one particularly preferred embodiment, use is made of particulate fillers of which at least 95% by weight, preferably at least 98% by weight, of the particles have a diameter (largest dimension), determined on the finished product, of less than 45 micrometers, preferably less than 40 micrometers, their "aspect ratio" preferably being in the range from 1 to 25, with preference in the range from 2 to 20, determined on the finished product, i.e. generally on an injection molding. The aspect ratio is the ratio of particle diameter to thickness (largest dimension to smallest dimension).

An example of the method for determining particle diameters here records electron micrographs of thin sections of the polymer mixture and utilizes at least 25, preferably at least 50, filler particles for evaluation. Particle diameters may also be determined by sedimentation analysis, as in Transactions of ASAE, page 491 (1983). The proportion of the fillers by weight whose diameter is less than 40 micrometers can also be measured by means of sieve analysis.

Particularly preferred particulate fillers E) are talc, kaolin, such as calcined kaolin, or wollastonite, or a mixture composed of two or of all of these fillers. Among these, particular preference is given to talc whose content of particles with diameter smaller than 40 micrometers is at least 95% by weight and whose aspect ratio is from 1.5 to 25, determined in each case on the finished product. Kaolin preferably has at least 95% by weight content of particles whose diameter is smaller than 20 micrometers and whose aspect ratio is from 1.2 to 20, determined in each case on the finished product.

By way of example, fibrous fillers, such as carbon fibers, potassium titanate whiskers, aramid fibers, or preferably glass fibers, are used as component E). The glass fibers can have a size and/or a coupling agent to improve compatibility with the polymer matrix. In one preferred embodiment, the length of at least 50% by weight of the fibrous fillers (glass fibers) is more than 50 micrometers. The diameter of the (glass) fibers used can preferably be up to 25 micrometers, particularly preferably from 5 to 13 micrometers. The length of at least 70% by weight of the glass fibers is preferably more than 60 micrometers. The average length of the glass fibers in the finished molding is particularly preferably from 0.08 to 5 mm.

The length of the glass fibers is based on a finished molding, for example obtained by injection molding. The form in which the glass fibers are added to the molding compositions may be that of short glass fibers in a form appropriately cut to length, or else may be that of continuous-filament strands (rovings). Other forms in which carbon fibers or glass fibers can be used are that of textiles, mats, or glass silk rovings.

The amount of component F present in the inventive molding compositions is from 0 to 2% by weight, preferably from 0 to 1.8% by weight, in particular from 0% by weight (if present, 0.1% by weight) to 1.5% by weight.

Component F is an—preferably low-molecular-weight halogen-free—organic acid.

For the purposes of the present invention, the term low-molecular-weight includes up to polynuclear compounds, for example up to pentanuclear compounds, in particular monomolecular compounds.

The acids are preferably halogen-free, i.e. comprise no halogens in their molecular skeleton. However, acids which have very small amounts of halogen-comprising impurities are included according to the invention. For the purposes of the invention, the term acids also includes their hydrates.

It is advantageous to use acids which have no, or only very slight, volatility at the processing temperatures and, respectively, have no, or only very slight, tendency toward decomposition at temperatures up to about 320° C.

The acids may comprise one, two, or more acid groups, for example up to ten acid groups.

It is preferable to use organic acids. Either aromatic or aliphatic acids may be used. It is also possible to use aliphatic-aromatic acids. Among the preferred acids are mono-, di-, and polycarboxylic acids, e.g. palmitic acid, stearic acid, benzoic acid, and substituted benzoic acids, isophthalic acid, terephthalic acid, trimellitic acid, sulfonic acids, such as p-toluenesulfonic acid, and aliphatic sulfonic acids, fumaric acid, citric acid, mandelic acid, or tartaric acid.

It is particularly preferable to use citric acid or p-toluenesulfonic acid, or a mixture of these. By way of example, the proportion by weight of citric acid in the mixture can be from 1 to 99%, preferably from 10 to 90%, and the proportion of p-toluenesulfonic acid can correspondingly be from 1 to 99%, preferably from 10 to 90%.

The amount of component G present in the inventive molding compositions is from 0 to 25% by weight, preferably from 0 to 20% by weight, in particular from 0% by weight (or if present 0.2% by weight) to 15% by weight.

Component G is a halogen-free phosphorus compound.

Any of the known conventional phosphorus-comprising flame retardants can be used as component G. It is preferable to use the flame retardants listed in DE-A-40 34 336 and/or those listed in EP-A 0 522 397. Examples are tri(2,6-dimethylphenyl)phosphate, triphenyl phosphate, tricresyl phosphate, diphenyl 2-ethylcresyl phosphate, diphenyl cresyl phosphate, tri(isopropylphenyl)phosphate, and bisphenyl 4-phenylphenyl phosphate, phenyl bis(4-phenylphenyl) phosphate, tris(4-phenylphenyl)phosphate, bisphenyl benzylphenyl phosphate, phenyl bis(benzylphenyl)phosphate, tris(benzylphenyl)phosphate, bisphenyl (1-phenylethyl)phenyl phosphate, phenyl bis(1-phenylethyl)phenyl phosphate, tris((1-phenylethyl)phenyl)phosphate, bisphenyl (1-methyl-1-phenylethyl)phenyl phosphate, phenyl bis(1-methyl-1-phenylethyl)phenyl phosphate, tris((1-methyl-1-phenylethyl)phenyl)phosphate, phenyl bis(4-(1-phenylethyl)-2,6-dimethylphenyl)phosphate, bisphenyl 2,4-dibenzylphenyl phosphate, bisphenyl 2,4-di(1-phenylethyl)phenyl phosphate, and bisphenyl 2,4-di(1-methyl-1-phenylethyl)phenyl phosphate. They can also be used in a mixture with triphenylphosphine oxide or tri(2,6-dimethylphenyl)phosphine oxide.

Other preferred flame retardants are resorcinol diphosphate and corresponding higher oligomers, and hydroquinone diphosphate and corresponding higher oligomers.

Reference is also made to the phosphorus compounds mentioned in EP-A-0 103 230, EP-A-0 174 493, EP-A-0 206 058, EP-A-0 363 608, and EP-A-0 558 266.

The amounts used of component H are from 0 to 45% by weight, preferably from 0 to 20% by weight, in particular from 0% by weight (if present 0.4% by weight) to 10% by weight.

Component H is other additives.

Examples of other additives that may be mentioned are processing aids, stabilizers and oxidation retarders, agents to counter decomposition by heat and decomposition by ultraviolet light, lubricants and molding-release agents, flame retardants, dyes and pigments, and plasticizers. The content of these is generally from 0 to 45% by weight, preferably from 0 to 20% by weight, in particular from 0% by weight (if present 0.2% by weight) to 10% by weight, based on the total weight of the mix.

The amounts of pigments and dyes generally present are from 0 to 4% by weight, preferably from 0 to 3.5% by weight, and in particular from 0% by weight (if present 0.5% by weight) to 3% by weight.

The pigments for pigmenting thermoplastics are well known (see, for example, R. Gächter and H. Müller, Taschenbuch der Kunststoffadditive [Plastics additives handbook], Carl Hanser Verlag, 1983, pp. 494-510. A first preferred group of pigments is that of white pigments, such as zinc oxide, zinc sulfide, white lead ($2PbCO_3.Pb(OH)_2$), lithopones, antimony white and titanium dioxide. Of the two most commonly encountered crystalline forms of titanium dioxide (rutile and anatase) it is in particular the rutile form which is used for white coloration of the inventive molding composition.

Black color pigments which may be used according to the invention are iron oxide black ($Fe_3O_4$), spinel black ($Cu(Cr, Fe)_2O_4$), manganese black (a mixture of manganese dioxide, silicon oxide, and iron oxide), cobalt black, and antimony black, and also particularly preferably carbon black, mostly used in the form of furnace black or gas black (see in this connection G. Benzing, Pigmente für Anstrichmittel [Pigments for paints], Expert-Verlag (1988), pp. 78 et seq.).

According to the invention, it is, of course, also possible to achieve particular shades by using inorganic chromatic pigments, such as chromium oxide green, or organic chromatic pigments, such as azo pigments or phthalocyanines. Pigments of this type are widely available commercially.

It can also be advantageous to use the pigments or dyes mentioned in a mixture, e.g. carbon black with copper phthalocyanines, because the result is generally easier dispersion of the color in the thermoplastic.

Other suitable colorants are described by way of example in R. Gächter and H. Müller (ed.), Plastics Additives Handbook, 4th ed. 1993, Reprint November 1996, Hanser Verlag Munich, on pp. 647-676.

Mention may also be made of fluorescent plasticizers, e.g. bisbenzoxazoles, triazine-phenylcumarins, benzotriazole-phenylcumarins, naphthotriazole-phenylcumarins, bis(styryl)bisphenyls. Other examples are mentioned on pp. 779-785 of the cited book by Gächter and Müller (4th edition 1993).

Examples of oxidation retarders and heat stabilizers which may be added to the thermoplastic materials according to the invention are halides of metals of group I of the Periodic Table of the Elements, e.g. sodium halides and lithium halides, if appropriate in combination with cuprous halides, e.g. with chlorides, with bromides, and with iodides. The halides, in particular of copper, can also comprise electron-rich p-ligands. Cu halide complexes with, for example, triphenylphosphine may be mentioned as an example of these copper complexes. It is also possible to use zinc fluoride and zinc chloride. It is also possible to use sterically hindered phenols, hydroquinones, substituted representatives of this group, secondary aromatic amines, if appropriate in combination with phosphorus-comprising acids, or their salts, and mixtures of these compounds, preferably at concentrations of up to 1% by weight, based on the weight of the mixture.

Examples of UV stabilizers are various substituted resorcinols, salicylates, benzotriazoles, and benzophenones, the amounts used generally being up to 2% by weight.

Lubricants and mold-release agents, generally used in amounts of up to 1% by weight of the thermoplastic material, are stearic acid, stearyl alcohol, alkyl stearates, and stearamides, and also esters of pentaerythritol with long-chain fatty acids. It is also possible to use stearates of calcium, of zinc, or of aluminum, or else dialkyl ketones, e.g. distearyl ketone. It is also possible to use ethylene oxide-propylene oxide copolymers as lubricants and mold-release agents.

It is particularly advantageous to use UV stabilizers and, respectively, heat stabilizers for polycarbonate and styrene copolymers. Examples of suitable stabilizers are also listed in DE-A-44 19 897. Transesterification inhibitors may moreover also be present, examples being phosphates, phosphites or phosphonites.

The inventive molding compositions can comprise as component H), from 0 to 50% by weight, preferably from 0.5 to 20% by weight, and in particular from 0.7 to 10% by weight, of H2) at least one highly branched or hyperbranched polycarbonate with an OH number of from 1 to 600 mg KOH/g of polycarbonate, preferably from 10 to 550 mg KOH/g of polycarbonate, and in particular from 50 to 550 mg KOH/g of polycarbonate (to DIN 53240, Part 2), or of at least one hyperbranched polyester as component H3), or a mixture of these, as explained below.

For the purposes of this invention, hyperbranched polycarbonates H2) are non-crosslinked macromolecules having hydroxy and carbonate groups and having both structural and molecular nonuniformity. Their structure may firstly be based on a central molecule in the same way as dendrimers, but with non-uniform chain length of the branches. Secondly, they may also have a linear structure with functional pendant groups, or else they may combine the two extremes, having linear and branched molecular portions. See also P. J. Flory, J. Am. Chem. Soc. 1952, 74, 2718, and H. Frey et al., Chem. Eur. J. 2000, 6, No. 14, 2499 for the definition of dendrimeric and hyperbranched polymers.

"Hyperbranched" in the context of the present invention means that the degree of branching (DB), i.e. the average number of dendritic linkages plus the average number of end groups per molecule, is from 10 to 99.9%, preferably from 20 to 99%, particularly preferably from 20 to 95%.

"Dendrimeric" in the context of the present invention means that the degree of branching is from 99.9 to 100%. See H. Frey et al., Acta Polym. 1997, 48, 30 for the definition of "degree of branching".

The degree of branching DB of the relevant substances is defined as $$DB = \frac{T+Z}{T+Z+L} \times 100\%,$$

(where T is the average number of terminal monomer units, Z is the average number of branched monomer units, and L is the average number of linear monomer units in the macromolecules of the respective substances).

Component H2) preferably has a number-average molar mass $M_n$ of from 100 to 15 000 g/mol, preferably from 200 to 12 000 g/mol, and in particular from 500 to 10 000 g/mol (GPC, PMMA standard).

The glass transition temperature Tg is in particular from −80° C. to +140° C., preferably from −60 to 120° C. (according to DSC, DIN 53765).

In particular, the viscosity (mPas) at 23° C. (to DIN 53019) is from 50 to 200 000, in particular from 100 to 150 000, and very particularly preferably from 200 to 100 000.

Component H2) is preferably obtainable via a process which comprises at least the following steps:

a) reacting at least one organic carbonate (A) of the general formula RO[(CO)]$_n$OR with at least one aliphatic, aliphatic/aromatic or aromatic alcohol (B) which has at least 3 OH groups, with elimination of alcohols ROH to give one or more condensates (K), where each R, independently of the others, is a straight-chain or branched aliphatic, aromatic/aliphatic, or aromatic hydrocarbon radical having from 1 to 20 carbon atoms, and where the radicals R may also have bonded to one another to form a ring, and n is a whole number from 1 to 5, or ab) reacting phosgene, diphosgene, or triphosgene with above-mentioned alcohol (B) with elimination of hydrogen chloride, and b) intermolecular reaction of the condensates (K) to give a highly functional, highly branched, or highly functional, hyperbranched polycarbonate, where the quantitative proportion of the OH groups to the carbonates in the reaction mixture is selected in such a way that the condensates (K) have an average of either one carbonate group and more than one OH group or one OH group and more than one carbonate group.

The starting material used can comprise phosgene, diphosgene, or triphosgene, but organic carbonates are preferred here.

Each of the radicals R of the organic carbonates (A) used as starting material and having the general formula RO(CO)OR is, independently of the others, a straight-chain or branched aliphatic, aromatic/aliphatic, or aromatic hydrocarbon radical having from 1 to 20 carbon atoms. The two radicals R may also have bonding to one another to form a ring. The radical is preferably an aliphatic hydrocarbon radical, and particularly preferably a straight-chain or branched alkyl radical having from 1 to 5 carbon atoms, or a substituted or unsubstituted phenyl radical.

In particular, simple carbonates of the formula RO(CO)$_n$OR are used; n is preferably from 1 to 3, in particular 1.

By way of example, dialkyl or diaryl carbonates may be prepared from the reaction of aliphatic, araliphatic, or aromatic alcohols, preferably monoalcohols, with phosgene. They may also be prepared by way of oxidative carbonylation of the alcohols or phenols by means of CO in the presence of noble metals, oxygen, or $NO_x$. In relation to preparation methods for diaryl or dialkyl carbonates, see also "Ullmann's Encyclopedia of Industrial Chemistry", 6th edition, 2000 Electronic Release, Verlag Wiley-VCH.

Examples of suitable carbonates comprise aliphatic, aromatic/aliphatic or aromatic carbonates, such as ethylene carbonate, propylene 1,2- or 1,3-carbonate, diphenyl carbonate, ditolyl carbonate, dixylyl carbonate, dinaphthyl carbonate, ethyl phenyl carbonate, dibenzyl carbonate, dimethyl carbonate, diethyl carbonate, dipropyl carbonate, dibutyl carbonate, diisobutyl carbonate, dipentyl carbonate, dihexyl carbonate, dicyclohexyl carbonate, diheptyl carbonate, dioctyl carbonate, didecyl carbonate, or didodecyl carbonate.

Examples of carbonates in which n is greater than 1 comprise dialkyl dicarbonates, such as di(tert-butyl)dicarbonate, or dialkyl tricarbonates, such as di(tert-butyl)tricarbonate.

It is preferable to use aliphatic carbonates, in particular those in which the radicals comprise from 1 to 5 carbon atoms, e.g. dimethyl carbonate, diethyl carbonate, dipropyl carbonate, dibutyl carbonate, or diisobutyl carbonate.

The organic carbonates are reacted with at least one aliphatic alcohol (B) which has at least 3 OH groups, or with mixtures of two or more different alcohols.

Examples of compounds having at least three OH groups comprise glycerol, trimethylolmethane, trimethylolethane, trimethylolpropane, 1,2,4-butanetriol, tris(hydroxymethyl) amine, tris(hydroxyethyl)amine, tris(hydroxypropyl)amine, pentaerythritol, diglycerol, triglyerol, polyglycerols, bis(trimethylolpropane), tris(hydroxymethyl)isocyanurate, tris(hydroxyethyl)isocyanurate, phloroglucinol, trihydroxytoluene, trihydroxydimethylbenzene, phloroglucides, hexahydroxybenzene, 1,3,5-benzenetrimethanol, 1,1,1-tris(4'-hydroxyphenyl)methane, 1,1,1-tris(4'-hydroxyphenyl)ethane, or sugars, e.g. glucose, trihydric or higher polyhydric polyetherols based on trihydric or higher polyhydric alcohols and ethylene oxide, propylene oxide, or butylene oxide, or polyesterols. Particular preference is given here to glycerol, trimethylolethane, trimethylolpropane, 1,2,4-butanetriol, pentaerythritol, and also their polyetherols based on ethylene oxide or propylene oxide.

These polyhydric alcohols may also be used in a mixture with dihydric alcohols (B'), with the proviso that the average total OH functionality of all of the alcohols used is greater than 2. Examples of suitable compounds having two OH groups comprise ethylene glycol, diethylene glycol, triethylene glycol, 1,2- and 1,3-propanediol, dipropylene glycol, tripropylene glycol, neopentyl glycol, 1,2-, 1,3-, and 1,4-butanediol, 1,2-, 1,3-, and 1,5-pentanediol, hexanediol, cyclopentanediol, cyclohexanediol, cyclohexanedimethanol, bis(4-hydroxycyclohexyl)methane, bis(4-hydroxycyclohexyl)ethane, 2,2-bis(4-hydroxycyclohexyl)propane, 1,1'-bis(4-hydroxyphenyl)-3,3,5-trimethylcyclohexane, resorcinol, hydroquinone, 4,4'-dihydroxyphenyl, bis(4-bis (hydroxyphenyl)sulfide, bis(4-hydroxyphenyl)sulfone, bis (hydroxymethyl)benzene, bis(hydroxymethyl)toluene, bis (p-hydroxyphenyl)methane, bis(p-hydroxyphenyl)ethane, 2,2-bis(p-hydroxyphenyl)propane, 1,1-bis(p-hydroxy-phenyl)cyclohexane, dihydroxybenzophenone, dihydric polyether polyols based on ethylene oxide, propylene oxide, butylene oxide, or a mixture of these, polytetrahydrofuran, polycaprolactone, or polyesterols based on diols and dicarboxylic acids.

The diols serve for fine adjustment of the properties of the polycarbonate. If dihydric alcohols are used, the ratio of dihydric alcohols B') to the at least trihydric alcohols (B) is set by the person skilled in the art as a function of the desired properties of the polycarbonate. The amount of the alcohol(s) (B') is generally from 0 to 39.9 mol %, based on the total amount of all of the alcohols (B) and (B'). The amount is preferably from 0 to 35 mol %, particularly preferably from 0 to 25 mol %, and very particularly preferably from 0 to 10 mol %.

The reaction of phosgene, diphosgene, or triphosgene with the alcohol or alcohol mixture generally takes place with elimination of hydrogen chloride, and the reaction of the carbonates with the alcohol or alcohol mixture to give the inventive highly functional highly branched polycarbonate takes place with elimination of the monohydric alcohol or phenol from the carbonate molecule.

The highly functional highly branched polycarbonates formed by the inventive process have termination by hydroxy groups and/or by carbonate groups after the reaction, i.e. with no further modification. They have good solubility in various solvents, e.g. in water, alcohols, such as methanol, ethanol, butanol, alcohol/water mixtures, acetone, 2-butanone, ethyl acetate, butyl acetate, methoxypropyl acetate, methoxyethyl acetate, tetrahydrofuran, dimethylformamide, dimethylacetamide, N-methylpyrrolidone, ethylene carbonate, or propylene carbonate.

For the purposes of this invention, a highly functional polycarbonate is a product which, besides the carbonate groups which form the polymer skeleton, further has at least three, preferably at least six, more preferably at least ten, terminal or pendant functional groups. The functional groups are carbonate groups and/or OH groups. There is in principle no upper restriction on the number of the terminal or pendant functional groups, but products having a very high number of functional groups can have undesired properties, such as high viscosity or poor solubility. The highly functional polycarbonates of the present invention mostly have not more than 500 terminal or pendant functional groups, preferably not more than 100 terminal or pendant functional groups.

When preparing the highly functional polycarbonates, it is necessary to adjust the ratio of the compounds comprising OH groups to phosgene or carbonate in such a way that the simplest resultant condensate (hereinafter termed condensate (K)) comprises an average of either one carbonate group or carbamoyl group and more than one OH group or one OH group and more than one carbonate group or carbamoyl group. The simplest structure of the condensate (K) composed of a carbonate (A) and a di- or polyalcohol (B) here results in the arrangement $XY_n$ or $Y_nX$, where X is a carbonate group, Y is a hydroxy group, and n is generally a number from 1 to 6, preferably from 1 to 4, particularly preferably from 1 to 3. The reactive group which is the single resultant group here is generally termed "focal group" below.

By way of example, if during the preparation of the simplest condensate (K) from a carbonate and a dihydric alcohol the reaction ratio is 1:1, the average result is a molecule of XY type, illustrated by the general formula 1.

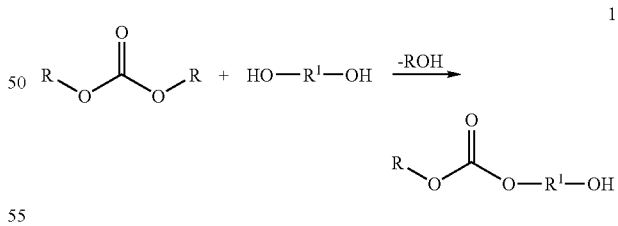

1

During the preparation of the condensate (K) from a carbonate and a trihydric alcohol with a reaction ratio of 1:1, the average result is a molecule of $XY_2$ type, illustrated by the general formula 2. A carbonate group is focal group here.

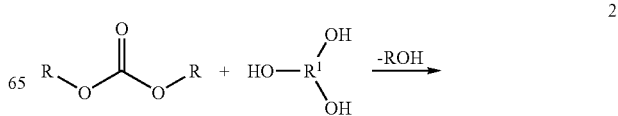

2

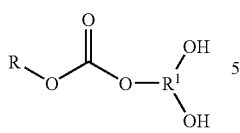

5

During the preparation of the condensate (K) from a carbonate and a tetrahydric alcohol, likewise with the reaction ratio 1:1, the average result is a molecule of $XY_3$ type, illustrated by the general formula 3. A carbonate group is focal group here.

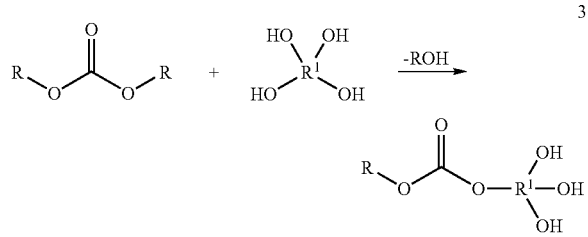

3

R in the formulae 1-3 has the definition given at the outset, and $R^1$ is an aliphatic or aromatic radical.

The condensate (K) may, by way of example, also be prepared from a carbonate and a trihydric alcohol, as illustrated by the general formula 4, the molar reaction ratio being 2:1. Here, the average result is a molecule of $X_2Y$ type, an OH group being focal group here. In formula 4, R and $R^1$ are as defined in formulae 1-3.

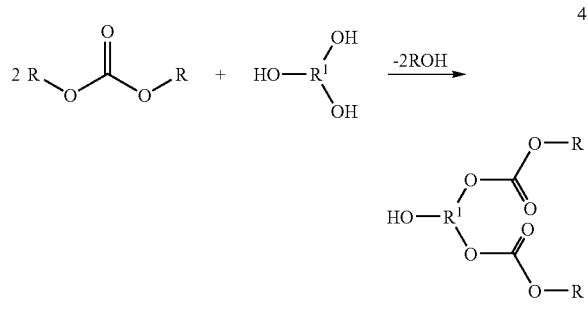

4

If difunctional compounds, e.g. a dicarbonate or a diol, are also added to the components, this extends the chains, as illustrated by way of example in the general formula 5. The average result is again a molecule of $XY_2$ type, a carbonate group being focal group.

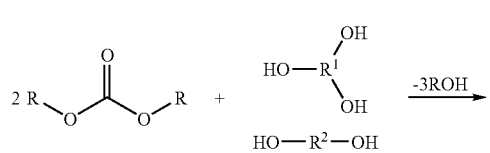

5

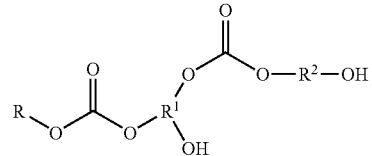

In formula 5, $R^2$ is an organic, preferably aliphatic radical, and R and $R^1$ are as defined above.

It is also possible to use two or more condensates (K) for the synthesis. Use may be made here firstly of two or more alcohols or of two or more carbonates. Mixtures of various condensates of different structure can moreover be obtained via selection of the ratio of the alcohols used and of the carbonates or of the phosgenes. This may be explained taking the example of the reaction of a carbonate with a trihydric alcohol. If the starting materials are introduced in a ratio of 1:1, as illustrated in (II), the result is an $XY_2$ molecule. If the starting materials are introduced in a ratio of 2:1 as illustrated in (IV), the result is an $X_2Y$ molecule. If the ratio is between 1:1 and 2:1 the result is a mixture of $XY_2$ and $X_2Y$ molecules.

According to the invention, the simple condensates (K) described by way of example in the formulae 1-5 preferentially react intermolecularly to form highly functional polycondensates, hereinafter termed polycondensates (P). The reaction to give the condensate (K) and to give the polycondensate (P) usually takes place at a temperature of from 0 to 250° C., preferably from 60 to 160° C., in bulk or in solution. Use may generally be made here of any of the solvents which are inert with respect to the respective starting materials. Preference is given to use of organic solvents, e.g. decane, dodecane, benzene, toluene, chlorobenzene, xylene, dimethylformamide, dimethylacetamide, or solvent naphtha.

In one preferred embodiment, the condensation reaction is carried out in bulk. The phenol or the monohydric alcohol ROH liberated during the reaction can be removed by distillation from the reaction equilibrium to accelerate the reaction, if appropriate at reduced pressure.

If removal by distillation is intended, it is generally advisable to use those carbonates which liberate alcohols ROH with a boiling point below 140° C. during the reaction.

Catalysts or catalyst mixtures may also be added to accelerate the reaction. Suitable catalysts are compounds which catalyze esterification or transesterification reactions, e.g. alkali metal hydroxides, alkali metal carbonates, alkali metal hydrogencarbonates, preferably of sodium, of potassium, or of cesium, tertiary amines, guanidines, ammonium compounds, phosphonium compounds, organoaluminum, organotin, organozinc, organotitanium, organozirconium, or organobismuth compounds, or else what are known as double metal cyanide (DMC) catalysts, e.g. as described in DE 10138216 or DE 10147712.

It is preferable to use potassium hydroxide, potassium carbonate, potassium hydrogencarbonate, diazabicyclooctane (DABCO), diazabicyclononene (DBN), diazabicycloundecene (DBU), imidazoles, such as imidazole, 1-methylimidazole, or 1,2-dimethylimidazole, titanium tetrabutoxide, titanium tetraisopropoxide, dibutyltin oxide, dibutyltin dilaurate, stannous dioctoate, zirconium acetylacetonate, or mixtures thereof.

The amount of catalyst generally added is from 50 to 10 000 ppm by weight, preferably from 100 to 5000 ppm by weight, based on the amount of the alcohol mixture or alcohol used.

It is also possible to control the intermolecular polycondensation reaction via addition of the suitable catalyst or else via selection of a suitable temperature. The average molecular weight of the polymer (P) may moreover be adjusted by way of the composition of the starting components and by way of the residence time.

The condensates (K) and the polycondensates (P) prepared at an elevated temperature are usually stable at room temperature for a relatively long period.

The nature of the condensates (K) permits polycondensates (P) with different structures to result from the condensation reaction, these having branching but no crosslinking. Furthermore, in the ideal case, the polycondensates (P) have either one carbonate group as focal group and more than two OH groups or else one OH group as focal group and more than two carbonate groups. The number of the reactive groups here is the result of the nature of the condensates (K) used and the degree of polycondensation.

By way of example, a condensate (K) according to the general formula 2 can react via triple intermolecular condensation to give two different polycondensates (P), represented in the general formulae 6 and 7.

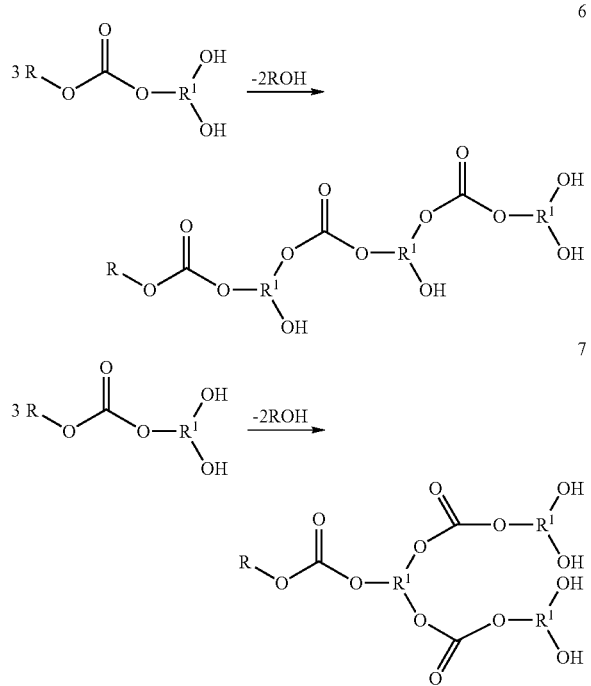

In formulae 6 and 7, R and $R^1$ are as defined above.

There are various ways of terminating the intermolecular polycondensation reaction. By way of example, the temperature may be lowered to a range where the reaction stops and the product (K) or the polycondensate (P) is storage-stable.

It is also possible to deactivate the catalyst, for example in the case of basic catalysts via addition of Lewis acids or proton acids.

In another embodiment, as soon as the intermolecular reaction of the condensate (K) has produced a polycondensate (P) with the desired degree of polycondensation, a product having groups reactive toward the focal group of (P) may be added to the product (P) to terminate the reaction. For example, in the case of a carbonate group as focal group, by way of example, a mono-, di-, or polyamine may be added. In the case of a hydroxy group as focal group, by way of example, a mono-, di-, or polyisocyanate, or a compound comprising epoxy groups, or an acid derivative which reacts with OH groups, can be added to the product (P).

The inventive highly functional polycarbonates are mostly prepared in the pressure range from 0.1 mbar to 20 bar, preferably at from 1 mbar to 5 bar, in reactors or reaction cascades which are operated batchwise, semicontinuously, or continuously.

The inventive products can be further processed without further purification after their preparation by virtue of the abovementioned adjustment of the reaction conditions and, if appropriate, by virtue of the selection of the suitable solvent.

In another preferred embodiment, the product is stripped, i.e. freed from low-molecular-weight, volatile compounds. For this, once the desired degree of conversion has been reached, the catalyst may optionally be deactivated and the low-molecular-weight volatile constituents, e.g. monoalcohols, phenols, carbonates, hydrogen chloride, or highly volatile oligomeric or cyclic compounds, can be removed by distillation, if appropriate with introduction of a gas, preferably nitrogen, carbon dioxide or air, if appropriate at reduced pressure.

In another preferred embodiment, the inventive polycarbonates may comprise other functional groups besides the functional groups present at this stage by virtue of the reaction. The functionalization may take place during the process to increase molecular weight, or else subsequently, i.e. after completion of the actual polycondensation.

If, prior to or during the process to increase molecular weight, components are added which have other functional groups or functional elements besides hydroxy or carbonate groups, the result is a polycarbonate polymer with randomly distributed functionalities other than the carbonate or hydroxy groups.

Effects of this type can, by way of example, be achieved via addition, during the polycondensation, of compounds which bear other functional groups or functional elements, such as mercapto groups, primary, secondary or tertiary amino groups, ether groups, derivatives of carboxylic acids, derivatives of sulfonic acids, derivatives of phosphonic acids, silane groups, siloxane groups, aryl radicals, or long-chain alkyl radicals, besides hydroxy groups, carbonate groups or carbamoyl groups. Examples of compounds which may be used for modification by means of carbamate groups are ethanolamine, propanolamine, isopropanolamine, 2-(butylamino)ethanol, 2-(cyclo-hexylamino)ethanol, 2-amino-1-butanol, 2-(2'-aminoethoxy)ethanol or higher alkoxylation products of ammonia, 4-hydroxypiperidine, 1-hydroxyethylpiperazine, diethanolamine, dipropanolamine, diisopropanolamine, tris(hydroxymethyl)amino-methane, tris(hydroxyethyl)aminomethane, ethylenediamine, propylenediamine, hexamethylenediamine or isophoronediamine.

An example of a compound which can be used for modification with mercapto groups is mercaptoethanol. By way of example, tertiary amino groups can be produced via incorporation of N-methyldiethanolamine, N-methyldipropanolamine or N,N-dimethylethanolamine. By way of example, ether groups may be generated via co-condensation of dihydric or higher polyhydric polyetherols. Long-chain alkyl radicals can be introduced via reaction with long-chain alkanediols, and reaction with alkyl or aryl diisocyanates generates polycarbonates having alkyl, aryl, and urethane groups or urea groups.

Ester groups can be produced via addition of dicarboxylic acids or tricarboxylic acids, for example, dimethyl terephthalate, or tricarboxylic esters.

Subsequent functionalization can be achieved by using an additional step of the process (step c)) to react the resultant highly functional highly branched, or highly functional hyperbranched polycarbonate with a suitable functionalizing reagent which can react with the OH and/or carbonate groups or carbamoyl groups of the polycarbonate.

By way of example, highly functional highly branched, or highly functional hyperbranched polycarbonates comprising hydroxy groups can be modified via addition of molecules comprising acid groups or comprising isocyanate groups. By way of example, polycarbonates comprising acid groups can be obtained via reaction with compounds comprising anhydride groups.

Highly functional polycarbonates comprising hydroxy groups may moreover also be converted into highly functional polycarbonate polyether polyols via reaction with alkylene oxides, e.g. ethylene oxide, propylene oxide, or butylene oxide.

A great advantage of the process is its cost-effectiveness. Both the reaction to give a condensate (K) or polycondensate (P) and also the reaction of (K) or (P) to give polycarbonates with other functional groups or elements can take place in one reactor, this being advantageous technically and in terms of cost-effectiveness.

The inventive molding compositions may comprise, as component H3), at least one hyperbranched polyester of $A_xB_y$ type, where x is at least 1.1, preferably at least 1.3, in particular at least 2 y is at least 2.1, preferably at least 2.5, in particular at least 3.

Use may also be made of mixtures as units A and/or B, of course.

An $A_xB_y$-type polyester is a condensate composed of an x-functional molecule A and a y-functional molecule B. By way of example, mention may be made of a polyester composed of adipic acid as molecule A (x=2) and glycerol as molecule B (y=3).

For the purposes of this invention, hyperbranched polyesters H3) are non-crosslinked macromolecules having hydroxy groups and carboxy groups, these having both structural and molecular non-uniformity. Their structure may firstly be based on a central molecule in the same way as dendrimers, but with non-uniform chain length of the branches. Secondly, they may also have a linear structure with functional pendant groups, or else they may combine the two extremes, having linear and branched molecular portions. See also P. J. Flory, J. Am. Chem. Soc. 1952, 74, 2718, and H. Frey et al., Chem. Eur. J. 2000, 6, no. 14, 2499 for the definition of dendrimeric and hyperbranched polymers.

"Hyperbranched" in the context of the present invention means that the degree of branching (DB), i.e. the average number of dendritic linkages plus the average number of end groups per molecule, is from 10 to 99.9%, preferably from 20 to 99%, particularly preferably from 20 to 95%. "Dendrimeric" in the context of the present invention means that the degree of branching is from 99.9 to 100%. See H. Frey et al., Acta Polym. 1997, 48, 30, and also the formula mentioned above under B1), for the definition of "degree of branching".

Component H3) preferably has an $M_n$ of from 300 to 30 000 g/mol, in particular from 400 to 25 000 g/mol, and very particularly from 500 to 20 000 g/mol, determined by means of GPC, PMMA standard, dimethylacetamide eluent.

H3) preferably has an OH number of from 0 to 600 mg KOH/g of polyester, preferably of from 1 to 500 mg KOH/g of polyester, in particular from 20 to 500 mg KOH/g of polyester to DIN 53240, and preferably a COOH number of from 0 to 600 mg KOH/g of polyester, preferably from 1 to 500 mg KOH/g of polyester, and in particular from 2 to 500 mg KOH/g of polyester.

The $T_g$ is preferably from −50° C. to 140° C., and in particular from −50 to 100° C. (by means of DSC, to DIN 53765).

Preference is particularly given to those components H3) in which at least one OH or COOH number is greater than 0, preferably greater than 0.1, and in particular greater than 0.5.

The inventive component H3) is in particular obtainable via the processes described below, specifically by reacting
(a) one or more dicarboxylic acids, or one or more derivatives of the same, with one or more at least trihydric alcohols, or
(b) one or more tricarboxylic acids or higher polycarboxylic acids, or one or more derivatives of the same, with one or more diols in the presence of a solvent and optionally in the presence of an inorganic, organometallic, or low-molecular-weight organic catalyst, or of an enzyme. The reaction in solvent is the preferred preparation method.

For the purposes of the present invention, highly functional hyperbranched polyesters H3) have molecular and structural non-uniformity. Their molecular non-uniformity distinguishes them from dendrimers, and they can therefore be prepared at considerably lower cost.

Among the dicarboxylic acids which can be reacted according to variant (a) are, by way of example, oxalic acid, malonic acid, succinic acid, glutaric acid, adipic acid, pimelic acid, suberic acid, azelaic acid, sebacic acid, undecane-α,ω-dicarboxylic acid, dodecane-α,ω-dicarboxylic acid, cis- and trans-cyclohexane-1,2-dicarboxylic acid, cis- and trans-cyclohexane-1,3-dicarboxylic acid, cis- and trans-cyclohexane-1,4-dicarboxylic acid, cis- and trans-cyclopentane-1,2-dicarboxylic acid, and cis- and trans-cyclopentane-1,3-dicarboxylic acid, and the abovementioned dicarboxylic acids may have substitution by one or more radicals selected from $C_1$-$C_{10}$-alkyl groups, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, 2-ethylhexyl, n-nonyl, and n-decyl, $C_3$-$C_{12}$-cycloalkyl groups, such as cyclopropyl, cyclobutyl, cyclopentyl, cyclohexyl, cycloheptyl, cyclooctyl, cyclononyl, cyclodecyl, cycloundecyl, and cyclododecyl; preference is given to cyclopentyl, cyclohexyl, and cycloheptyl;

alkylene groups, such as methylene or ethylidene, or $C_6$-$C_{14}$-aryl groups, such as phenyl, 1-naphthyl, 2-naphthyl, 1-anthryl, 2-anthryl, 9-anthryl, 1-phenanthryl, 2-phenanthryl, 3-phenanthryl, 4-phenanthryl, and 9-phenanthryl, preferably phenyl, 1-naphthyl, and 2-naphthyl, particularly preferably phenyl.

Examples which may be mentioned of representatives of substituted dicarboxylic acids are: 2-methylmalonic acid, 2-ethylmalonic acid, 2-phenylmalonic acid, 2-methylsuccinic acid, 2-ethylsuccinic acid, 2-phenylsuccinic acid, itaconic acid, 3,3-dimethylglutaric acid.

Among the dicarboxylic acids which can be reacted according to variant (a) are also ethylenically unsaturated acids, such as maleic acid and fumaric acid, and aromatic dicarboxylic acids, such as phthalic acid, isophthalic acid or terephthalic acid.

It is also possible to use mixtures of two or more of the abovementioned representative compounds.

The dicarboxylic acids may either be used as they stand or be used in the form of derivatives.

Derivatives are preferably the relevant anhydrides in monomeric or else polymeric form, mono- or dialkyl esters, preferably mono- or dimethyl esters, or the corresponding mono- or diethyl esters, or else the mono- and dialkyl esters derived from higher alcohols, such as n-propanol, isopropanol, n-butanol, isobutanol, tert-butanol, n-pentanol, n-hexanol, and also mono- and divinyl esters, and mixed esters, preferably methyl ethyl esters.

In the preferred preparation process it is also possible to use a mixture composed of a dicarboxylic acid and one or more of its derivatives. Equally, it is possible to use a mixture of two or more different derivatives of one or more dicarboxylic acids.

It is particularly preferable to use succinic acid, glutaric acid, adipic acid, phthalic acid, isophthalic acid, terephthalic acid, or the mono- or dimethyl ester thereof. It is very particularly preferable to use adipic acid.

Examples of at least trihydric alcohols which may be reacted are: glycerol, butane-1,2,4-triol, n-pentane-1,2,5-triol, n-pentane-1,3,5-triol, n-hexane-1,2,6-triol, n-hexane-1,2,5-triol, n-hexane-1,3,6-triol, trimethylolbutane, trimethylolpropane or ditrimethylolpropane, trimethylolethane, pentaerythritol or dipentaerythritol; sugar alcohols, such as mesoerythritol, threitol, sorbitol, mannitol, or mixtures of the above at least trihydric alcohols. It is preferable to use glycerol, trimethylolpropane, trimethylolethane, and pentaerythritol.

Examples of tricarboxylic acids or polycarboxylic acids which can be reacted according to variant (b) are benzene-1,2,4-tricarboxylic acid, benzene-1,3,5-tricarboxylic acid, benzene-1,2,4,5-tetracarboxylic acid, and mellitic acid.

Tricarboxylic acids or polycarboxylic acids may be used in the inventive reaction either as they stand or else in the form of derivatives.

Derivatives are preferably the relevant anhydrides in monomeric or else polymeric form, mono-, di-, or trialkyl esters, preferably mono-, di-, or trimethyl esters, or the corresponding mono-, di-, or triethyl esters, or else the mono-, di-, and triesters derived from higher alcohols, such as n-propanol, isopropanol, n-butanol, isobutanol, tert-butanol, n-pentanol, n-hexanol, or else mono-, di-, or trivinyl esters and mixed methyl ethyl esters.

For the purposes of the present invention, it is also possible to use a mixture composed of a tri- or polycarboxylic acid and one or more of its derivatives. For the purposes of the present invention it is likewise possible to use a mixture of two or more different derivatives of one or more tri- or polycarboxylic acids, in order to obtain component H3).

Examples of diols used for variant (b) of the present invention are ethylene glycol, propane-1,2-diol, propane-1,3-diol, butane-1,2-diol, butane-1,3-diol, butane-1,4-diol, butane-2,3-diol, pentane-1,2-diol, pentane-1,3-diol, pentane-1,4-diol, pentane-1,5-diol, pentane-2,3-diol, pentane-2,4-diol, hexane-1,2-diol, hexane-1,3-diol, hexane-1,4-diol, hexane-1,5-diol, hexane-1,6-diol, hexane-2,5-diol, heptane-1,2-diol, 1,7-heptanediol, 1,8-octanediol, 1,2-octanediol, 1,9-nonanediol, 1,10-decanediol, 1,2-decanediol, 1,12-dodecanediol, 1,2-dodecanediol, 1,5-hexadiene-3,4-diol, cyclopentanediols, cyclohexanediols, inositol and derivatives, (2)-methylpentane-2,4-diol, 2,4-dimethyl-pentane-2,4-diol, 2-ethylhexane-1,3-diol, 2,5-dimethylhexane-2,5-diol, 2,2,4-trimethyl-pentane-1,3-diol, pinacol, diethylene glycol, triethylene glycol, dipropylene glycol, tripropylene glycol, polyethylene glycols $HO(CH_2CH_2O)_n$—H or polypropylene glycols $HO(CH[CH_3]CH_2O)_n$—H or mixtures of two or more representative compounds of the above compounds, where n is a whole number and n=4. One, or else bath, of the hydroxy groups here in the abovementioned diols may also be replaced by SH groups. Preference is given to ethylene glycol, propane-1,2-diol, and diethylene glycol, triethylene glycol, dipropylene glycol, and tripropylene glycol.

The molar ratio of the molecules A to molecules B in the $A_xB_y$ polyester in the variants (a) and (b) is from 4:1 to 1:4, in particular from 2:1 to 1:2.

The at least trihydric alcohols reacted according to variant (a) of the process may have hydroxy groups of which all have identical reactivity. Preference is also given here to at least trihydric alcohols whose OH groups initially have identical reactivity, but where reaction with at least one acid group can induce a fall-off in reactivity of the remaining OH groups as a result of steric or electronic effects. By way of example, this applies when trimethylolpropane or pentaerythritol is used.

However, the at least trihydric alcohols reacted according to variant (a) may also have hydroxy groups having at least two different chemical reactivities.

The different reactivity of the functional groups here may derive either from chemical causes (e.g. primary/secondary/tertiary OH group) or from steric causes.

By way of example, the trio may comprise a trio which has primary and secondary hydroxy groups, a preferred example being glycerol.

When the inventive reaction is carried out according to variant (a), it is preferable to operate in the absence of diols and monohydric alcohols.

When the inventive reaction is carried out according to variant (b), it is preferable to operate in the absence of mono- or dicarboxylic acids.

The inventive process is carried out in the presence of a solvent. Examples of suitable compounds are hydrocarbons, such as paraffins or aromatics. Particularly suitable paraffins are n-heptane and cyclohexane. Particularly suitable aromatics are toluene, ortho-xylene, meta-xylene, para-xylene, xylene in the form of an isomer mixture, ethylbenzene, chlorobenzene and ortho- and meta-dichlorobenzene. Other very particularly suitable solvents in the absence of acidic catalysts are: ethers, such as dioxane or tetrahydrofuran, and ketones, such as methyl ethyl ketone and methyl isobutyl ketone.

According to the invention, the amount of solvent added is at least 0.1% by weight, based on the weight of the starting materials used and to be reacted, preferably at least 1% by weight, and particularly preferably at least 10% by weight. It is also possible to use excesses of solvent, based on the weight of starting materials used and to be reacted, e.g. from 1.01 to 10 times the amount. Solvent amounts of more than 100 times the weight of the starting materials used and to be reacted are not advantageous, because the reaction rate decreases markedly at markedly lower concentrations of the reactants, giving uneconomically long reaction times.

To carry out the process preferred according to the invention, operations may be carried out in the presence of a dehydrating agent as additive, added at the start of the reaction. Suitable examples are molecular sieves, in particular 4 Å molecular sieve, $MgSO_4$, and $Na_2SO_4$. During the reaction it is also possible to add further dehydrating agent or to replace dehydrating agent by fresh dehydrating agent. During the reaction it is also possible to remove the water or alcohol formed by distillation and, for example, to use a water trap.

The process may be carried out in the absence of acidic catalysts. It is preferable to operate in the presence of an acidic inorganic, organometallic, or organic catalyst, or a mixture composed of two or more acidic inorganic, organometallic, or organic catalysts.

For the purposes of the present invention, examples of acidic inorganic catalysts are sulfuric acid, phosphoric acid, phosphonic acid, hypophosphorous acid, aluminum sulfate hydrate, alum, acidic silica gel (pH=6, in particular =5), and acidic aluminum oxide. Examples of other compounds which can be used as acidic inorganic catalysts are aluminum compounds of the general formula $Al(OR)_3$ and titanates of the general formula $Ti(OR)_4$, where each of the radicals R may be identical or different and is selected independently of the others from $C_1$-$C_{10}$-alkyl radicals, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, 2-ethylhexyl, n-nonyl, and n-decyl, $C_3$-$C_{12}$-cycloalkyl radicals, such as cyclopropyl, cyclobutyl, cyclopentyl, cyclohexyl, cycloheptyl, cyclooctyl, cyclononyl, cyclodecyl, cycloundecyl, and cyclododecyl; preference is given to cyclopentyl, cyclohexyl, and cycloheptyl.

Each of the radicals R in $Al(OR)_3$ or $Ti(OR)_4$ is preferably identical and selected from isopropyl or 2-ethylhexyl.

Examples of preferred acidic organometallic catalysts are selected from dialkyltin oxides $R_2SnO$, where R is defined as above. A particularly preferred representative compound for acidic organometallic catalysts is di-n-butyltin oxide, which is commercially available as "oxo-tin", or di-n-butyltin dilaurate.

Preferred acidic organic catalysts are acidic organic compounds having, by way of example, phosphate groups, sulfonic acid groups, sulfate groups, or phosphonic acid groups. Particular preference is given to sulfonic acids, such as paratoluenesulfonic acid. Acidic ion exchangers may also be used as acidic organic catalysts, e.g. polystyrene resins comprising sulfonic acid groups and crosslinked with about 2 mol % of divinylbenzene.

It is also possible to use combinations of two or more of the abovementioned catalysts. It is also possible to use an immobilized form of those organic or organometallic, or else inorganic catalysts which take the form of discrete molecules.

If the intention is to use acidic inorganic, organometallic, or organic catalysts, according to the invention the amount used is from 0.1 to 10% by weight, preferably from 0.2 to 2% by weight, of catalyst.

The inventive process is carried out under inert gas, e.g. under carbon dioxide, nitrogen, or a noble gas, among which mention may particularly be made of argon.

The inventive process is carried out at temperatures of from 60 to 200° C. It is preferable to operate at temperatures of from 130 to 180° C., in particular up to 150° C., or below that temperature. Maximum temperatures up to 145° C. are particularly preferred, and temperatures up to 135° C. are very particularly preferred.

The pressure conditions for the inventive process are not critical per se. It is possible to operate at markedly reduced pressure, e.g. at from 10 to 500 mbar. The inventive process may also be carried out at pressures above 500 mbar. A reaction at atmospheric pressure is preferred for reasons of simplicity; however, conduct at slightly increased pressure is also possible, e.g. up to 1200 mbar. It is also possible to operate at markedly increased pressure, e.g. at pressures up to 10 bar. Reaction at atmospheric pressure is preferred.

The reaction time for the inventive process is usually from 10 minutes to 25 hours, preferably from 30 minutes to 10 hours, and particularly preferably from one to 8 hours.

Once the reaction has ended, the highly functional hyperbranched polyesters can easily be isolated, e.g. by removing the catalyst by filtration and concentrating the mixture, the concentration process here usually being carried out at reduced pressure. Other work-up methods with good suitability are precipitation after addition of water, followed by washing and drying.

Component H3) can also be prepared in the presence of enzymes or decomposition products of enzymes (according to DE-A 101 63163). For the purposes of the present invention, the term acidic organic catalysts does not include the dicarboxylic acids reacted according to the invention.

It is preferable to use lipases or esterases. Lipases and esterases with good suitability are *Candida cylindracea, Candida lipolytica, Candida rugosa, Candida antarctica, Candida utilis, Chromobacterium viscosum, Geotrichum viscosum, Geotrichum candidum, Mucor javanicus, Mucor mihei,* pig pancreas, pseudomonas spp., *pseudomonas fluorescens, Pseudomonas cepacia, Rhizopus arrhizus, Rhizopus delemar, Rhizopus niveus, Rhizopus oryzae, Aspergillus niger, Penicillium roquefortii, Penicillium camembertii*, or esterase from *Bacillus* spp. and *Bacillus thermoglucosidasius. Candida antarctica* lipase B is particularly preferred. The enzymes listed are commercially available, for example from Novozymes Biotech Inc., Denmark.

The enzyme is preferably used in immobilized form, for example on silica gel or Lewatit®. The processes for immobilizing enzymes are known per se, e.g. from Kurt Faber, "Biotransformations in organic chemistry" 3rd edition 1997, Springer Verlag, Chapter 3.2 "Immobilization" pp. 345-356. Immobilized enzymes are commercially available, for example from Novozymes Biotech Inc., Denmark.

The amount of immobilized enzyme used is from 0.1 to 20% by weight, in particular from 10 to 15% by weight, based on the total weight of the starting materials used and to be reacted.

The inventive process is carried out at temperatures above 60° C. It is preferable to operate at temperatures of 100° C. or below that temperature. Preference is given to temperatures up to 80° C., very particular preference is given to temperatures of from 62 to 75° C., and still more preference is given to temperatures of from 65 to 75° C.

The inventive process is carried out in the presence of a solvent. Examples of suitable compounds are hydrocarbons, such as paraffins or aromatics. Particularly suitable paraffins are n-heptane and cyclohexane. Particularly suitable aromatics are toluene, ortho-xylene, meta-xylene, para-xylene, xylene in the form of an isomer mixture, ethylbenzene, chlorobenzene and ortho- and meta-dichlorobenzene. Other very particularly suitable solvents are: ethers, such as dioxane or tetrahydrofuran, and ketones, such as methyl ethyl ketone and methyl isobutyl ketone.

The amount of solvent added is at least 5 parts by weight, based on the weight of the starting materials used and to be reacted, preferably at least 50 parts by weight, and particularly preferably at least 100 parts by weight. Amounts of more than 10 000 parts by weight of solvent are undesirable, because the reaction rate decreases markedly at markedly lower concentrations, giving uneconomically long reaction times.

The inventive process is carried out at pressures above 500 mbar. Preference is given to the reaction at atmospheric pressure or slightly increased pressure, for example at up to 1200 mbar. It is also possible to operate under markedly increased pressure, for example at pressures up to 10 bar. The reaction at atmospheric pressure is preferred.

The reaction time for the inventive process is usually from 4 hours to 6 days, preferably from 5 hours to 5 days, and particularly preferably from 8 hours to 4 days.

Once the reaction has ended, the highly functional hyperbranched polyesters can be isolated, e.g. by removing the enzyme by filtration and concentrating the mixture, the concentration process here usually being carried out at reduced pressure. Other work-up methods with good suitability are precipitation after addition of water, followed by washing and drying.

The highly functional, hyperbranched polyesters obtainable by the inventive process feature particularly low contents of discolored and resinified material. For the definition of hyperbranched polymers, see also: P. J. Flory, J. Am. Chem. Soc. 1952, 74, 2718, and A. Sunder et al., Chem. Eur. J. 2000, 6, no. 1, 1-8. However, in the context of the present invention, "highly functional hyperbranched" means that the degree of branching, i.e. the average number of dendritic linkages plus the average number of end groups per molecule is from 10 to 99.9%, preferably from 20 to 99%, particularly preferably from 30 to 90% (see in this connection H. Frey et al. Acta Polym. 1997, 48, 30).

The inventive polyesters have a molar mass $M_w$ of from 500 to 50 000 g/mol, preferably from 1000 to 20 000 g/mol, particularly preferably from 1000 to 19 000 g/mol. The polydispersity is from 1.2 to 50, preferably from 1.4 to 40, particularly preferably from 1.5 to 30, and very particularly preferably from 1.5 to 10. They are usually very soluble, i.e. clear solutions can be prepared using up to 50% by weight, in some cases even up to 80% by weight, of the inventive polyesters in tetrahydrofuran (THF), n-butyl acetate, ethanol, and numerous other solvents, with no gel particles detectable by the naked eye.

The inventive highly functional hyperbranched polyesters are carboxy-terminated, carboxy- and hydroxy-terminated, and preferably hydroxy-terminated.

If a mixture of the components H2) and H3) is used, the ratios of the components H2):H3) are preferably from 1:20 to 20:1, in particular from 1:15 to 15:1, and very particularly from 1:5 to 5:1.

Preparation of Molding Compositions

The inventive thermoplastic molding compositions are prepared by processes known per se via mixing of the components. It can be advantageous to premix individual components. It is also possible to mix the components in solution and remove the solvents. Examples of suitable organic solvents are chlorobenzene, mixtures of chlorobenzene and methylene chloride, or mixtures of chlorobenzene and aromatic hydrocarbons, such as toluene. It is preferable to operate without chlorinated solvents. By way of example, vented extruders can be used for evaporating the solvent from the mixtures.

The (for example dry) components A to D and, if appropriate, E to H—or in the case of the abovementioned in-situ preparation of the copolymer D, mixing of the components A, B, C, D1 and D2 and, if appropriate, E to H—can be mixed by any of the known methods. They are preferably mixed at temperatures of from 200 to 320° C. by extruding, kneading, or rolling of the components together, the component here having been, if appropriate, previously isolated from the solution obtained during the polymerization reaction or from the aqueous dispersion.

Accordingly, a process for preparation of the inventive molding compositions has also been found, via mixing of the dry components A to D (or D1 and D2) and, if appropriate, E to H, at from 200 to 320° C.

The inventive thermoplastic molding compositions can be processed by the known methods of thermoplastics processing, for example via extrusion, injection molding, calendering, blow molding, or sintering.

The inventive molding compositions can be used to produce moldings, fibers, and foils. They can moreover particularly preferably be used for production of bodywork parts.

In particular, the molding compositions are suitable for production of bodywork parts (e.g. in the automobile sector), particularly preferably for large-surface-area exterior bodywork parts, such as wheel surrounds, tailgates, front hoods, etc.

The invention therefore also provides corresponding moldings, fibers, or foils, and bodywork parts.

The inventive molding compositions, and moldings, fibers, and foils in particular feature good toughness and improved processing performance.

The invention is described in more detail via the examples below.

EXAMPLES

The average particle size and the particle size distribution were determined from the cumulative weight distribution on a specimen after ignition and ultrasound dispersion. The average particle sizes are in all cases the weight average of the particle sizes, as determined by means of an analytical ultracentrifuge, using the method of W. Scholtan and H. Lange, Kolloid-Z, und Z.-Polymere 250 (1972), pages 782-796. The ultracentrifuge measurement gives the cumulative weight distribution of the particle diameter of a specimen. From this it is possible to deduce what percentage by weight of the particles have a diameter identical to or smaller than a particular size. The average particle diameter, which is also termed the $d_{50}$ value of the cumulative weight distribution, is defined here as that particle diameter at which 50% by weight of the particles have a diameter smaller than that corresponding to the $d_{50}$. Equally, 50% by weight of the particles then have a diameter larger than the $d_{50}$. To describe the breadth of the particle size distribution of the rubber particles, $d_{10}$ and $d_{90}$ values given by the cumulative weight distribution are utilized alongside the $d_{50}$ value (average particle diameter). The $d_{10}$ and $d_{90}$ of the cumulative weight distribution are defined similarly to the $d_{50}$ with the difference that they are based on, respectively, 10 and 90% by weight of the particles. The quotient $Q=(d_{90}-d_{10})/d_{50}$ is a measure of the breadth of the particle size distribution.

The following components were used:

A: polybutylene terephthalate with a viscosity number VZ of 130 ml/g, measured to DIN 53727 on a 0.5% strength by weight solution at 25° C. in phenol/o-dichlorobenzene 1:1, comprising 0.65% by weight, based on A, of pentaerythritol tetrastearate.

B1: a fine-particle graft polymer, prepared from
  b1) 16 g of butyl acrylate and 0.4 g of tricyclodecenyl acrylate, which had been heated to 60° C. in 150 g of water with addition of 1 g of the sodium salt of a $C_{13}$-$C_{18}$ paraffinsulfonic acid, 0.3 g of potassium persulfate, 0.3 g of sodium hydrogencarbonate, and 0.15 g of sodium pyrophosphate, with stirring. 10 minutes after the start of the polymerization reaction, and within a period of 3 hours, a mixture composed of 82 g of butyl acrylate and 1.6 g of tricyclodecenyl acrylate was added. Once monomer addition had ended, stirring was continued for one hour. The resultant latex of the crosslinked butyl acrylate polymer had 40% by weight solids content, the average particle size (weight average) was determined as 76 nm, and the particle size distribution was narrow (quotient Q=0.29).

b2) 150 g of the polybutyl acrylate latex obtained as in b1) were mixed with 40 g of a mixture composed of styrene and acrylonitrile (ratio by weight 75:25), and with 60 g of water, and heated to 65° C. for 4 hours, with stirring, after addition of a further 0.03 g of potassium persulfate and 0.05 g of lauroyl peroxide. Once this graft copolymerization reaction had ended, the polymerization product was precipitated from the dispersion by means of calcium chloride solution at 95° C., washed with water, and dried in a stream of warm air. The degree of grafting of the graft copolymer was 35%, and the average particle size was 91 nm.

B2: a coarse-particle graft polymer prepared as follows:

b3) the following materials were added at 60° C. over the course of 3 hours to an initial charge composed of 1.5 g of the latex prepared as in b1), after addition of 50 g of water and 0.1 g of potassium persulfate: firstly a mixture composed of 49 g of butyl acrylate and 1 g of tricyclodecenyl acrylate, and secondly a solution of 0.5 g of the sodium salt of a $C_{12}$-$C_{18}$ paraffinsulfonic acid in 25 g of water. Polymerization was then continued for 2 hours. The resultant latex of the crosslinked butyl acrylate polymer had 40% solids content. The average particle size (weight average) of the latex was determined as 430 nm, and the particle size distribution was narrow (Q=0.1).

b4) 150 g of the latex obtained as in b3) were mixed with 20 g of styrene and 60 g of water and heated for 3 hours to 65° C., with stirring, after addition of a further 0.03 g of potassium persulfate and 0.05 g of lauroyl peroxide. The dispersion obtained during this graft copolymerization reaction was then polymerized for a further 4 hours with 20 g of a mixture composed of styrene and acrylonitrile in a ratio by weight of 75:25. The reaction product was then precipitated from the dispersion by means of a calcium chloride solution at 95° C., isolated, washed with water, and dried in a stream of warm air. The degree of grafting of the graft copolymer was determined to 35%, and the average particle size of the latex particles was 510 nm.

C1: a copolymer composed of 81% by weight of styrene and 19% by weight of acrylonitrile, prepared via continuous solution polymerization, as described in Kunststoff-Handbuch [Plastics Handbook], ed. R. Vieweg and G. Daumiller, volume 5 "Polystyrol" [Polystyrene], Hanser-Verlag, Munich 1969, on pp. 122-124. The viscosity number (determined to DIN 53727 on a 0.5% strength by weight solution in dimethylformamide at 23° C.) was 72 ml/g, corresponding to a weight-average molar mass of 174 000 g/mol.

Ccomp1: terpolymer composed of 68% by weight of styrene, 29.9% by weight of acrylonitrile, and 2.1% by weight of maleic anhydride with a viscosity number of 65 ml/g (measured in a 0.5% strength by weight solution in dimethylformamide at 23° C.).

Ccomp2: poly(methylene(phenylene isocyanate)), with NCO content of 31.2% by weight (determined to DIN 53185) and with a viscosity of 200 mPas at 25° C. (determined to DIN EN ISO 3219), e.g. Lupranat® M20A from BASF Aktiengesellschaft.

D1: obtained via extrusion at T=260° C. of 50% of a copolymer composed of 93% by weight of MMA, 2% by weight of n-butyl acrylate, and 5% by weight of glycidyl methacrylate with a viscosity number of 66 ml/g (measured in 0.5% strength by weight solution in chloroform at 23° C.) with 50% of a polybutylene terephthalate [e.g. Ultradur® B 4500, characterized via a viscosity number of 130 (measured in 0.5% strength by weight solution composed of phenol/o-dichlorobenzene)].

Dcomp: copolymer composed of 93% by weight of MMA, 2% by weight of n-butyl acrylate, and 5% by weight of glycidyl methacrylate with viscosity number of 66 ml/g (measured in 0.5% strength by weight solution in chloroform at 23° C.).

E1: IT-Extra talc, producer: Norwegian Talc
$X_{10}$=1.7 μm, $X_{90}$=10.82 μm [determined by means of laser scattering, the minerals having been homogenized in a suspension cell in a mixture of deionized water and 1% of CV-K8 surfactant (marketed by: CV-Chemievertrieb, Hanover) (magnetic stirrer, rotation rate 60 rpm)]. pH of aqueous suspension: 8.5.

E2: glass fiber with epoxy silane size and with fiber diameter of 10 μm (e.g. PPG 3786).

F1: citric acid hydrate, purity 99%, Aldrich.

H: a high-molecular-weight multicomponent ester composed of pentaerythritol and dicarboxylic acids with a viscosity of from 110 to 150 mPa*s at 80° C. (Loxiol®G 70S from Cognis).

Preparation of Thermoplastic Molding Compositions

Components A) to H) were mixed at from 250 to 280° C. in a twin-screw extruder (ZSK 30 from Werner & Pfleiderer), extruded, cooled and pelletized.

The dried pellets were processed at from 260 to 280° C. to give standard small specimens, ISO test specimens, and discs (60×3 mm), the mold temperature being 80° C.

Heat resistance of the specimens was determined by means of the Vicat softening point. Vicat softening point was determined to DIN 53460 on standard small specimens, using a force of 49.05 N and a temperature rise of 50 K per hour.

Flowability of the molding compositions was determined to DIN 53735 at a temperature of 250° C., with 10 kg load. Melt stability was determined on the basis of the change in MVI value after heating (280° C., 20 minutes).

$$\Delta MVI = \left(\frac{MVI_{20'} - MVI_{0'}}{MVI_{0'}}\right) \times 100\%,$$

Notched impact strength was tested to ISO 179 1 eA at room temperature on ISO specimens.

Table 1 gives the mixes and the properties of the thermoplastic molding compositions.

TABLE 1

| Component [% by weight] | Molding composition No. | | | | | | | | |
|---|---|---|---|---|---|---|---|---|---|
| | comp 1 | 2 | comp 3 | comp 4 | 5 | comp 6 | 7 | 8 | 9 |
| A | 65 | 60 | 65 | 64.7 | 60 | 49.5 | 44.5 | 44.3 | 49.5 |
| B1 | 25 | 25 | 25 | 24.8 | 12.5 | 30 | 30 | 30 | 12.5 |
| B2 | — | — | — | — | 12.5 | — | — | — | 12.5 |

TABLE 1-continued

| Component [% by weight] | Molding composition No. | | | | | | | | |
|---|---|---|---|---|---|---|---|---|---|
| | comp 1 | 2 | comp 3 | comp 4 | 5 | comp 6 | 7 | 8 | 9 |
| C1 | 10 | 5 | 5 | 5 | 5 | 10 | 5 | 5 | 5 |
| Ccomp1 | — | — | — | 5 | — | — | — | — | — |
| Ccomp2 | — | — | — | 0.5 | — | — | — | — | — |
| D1 | — | 10 | — | — | 10 | — | 10 | 10 | 10 |
| Dcomp | — | — | 5 | — | — | — | — | — | — |
| E1 | — | — | — | — | — | 10 | 10 | 10 | — |
| E2 | — | — | — | — | — | — | — | — | 10 |
| F | — | — | — | — | — | — | — | 0.2 | — |
| H1 | — | — | — | — | — | 0.5 | 0.5 | 0.5 | 0.5 |
| Vicat B [° C.] | 108 | 110 | 110 | 109 | 110 | 112 | 112 | 113 | 167 |
| ak, RT [kJ/m$^2$] | 6.3 | 14.1 | 12.1 | 8.6 | 16.2 | 5.3 | 11.0 | 12.1 | 5.9 |
| W$_s$ – 30° C. [Nm] | 2 | 39 | 26 | 8 | 51 | 1 | 18 | 21 | 2 |
| ΔMVI [%] | −15 | 4 | 17 | 45 | 5 | −19 | 7 | 8 | 6 |

We claim:

1. A thermoplastic molding composition, comprising
A) from 10 to 97.5% by weight of at least one thermoplastic polyester A,
B) from 1 to 97.5% by weight of at least one graft polymer B composed of
  b1) from 40 to 80% by weight of a graft base composed of an elastomeric polymer B1 based on alkyl acrylates having from 1 to 8 carbon atoms in the alkyl radical, on ethylene/propylene, on dienes, or on siloxanes, and with a glass transition temperature below 0° C.,
  b2) from 20 to 60% by weight of a graft B2 composed of
  b21) from 60 to 95% by weight of styrene or of substituted styrenes B21 of the general formula I

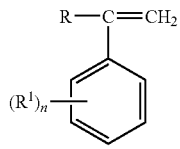

where R is a $C_{1-8}$-alkyl radical or hydrogen and $R^1$ is a $C_{1-8}$-alkyl radical and n is 1, 2, or 3, or a mixture of these, and
  b22) from 5 to 40% by weight of at least one unsaturated nitrile B22,
C) from 1 to 97.5% by weight of at least one thermoplastic copolymer C composed of
  c1) from 60 to 85% by weight of styrene or of substituted styrenes C1 of the general formula I, or a mixture thereof, and
  c2) from 15 to 40% by weight of at least one unsaturated nitrile C2,
D) from 0.5 to 50% by weight of at least one copolymer D, obtainable obtained via reaction of
  d1) from 5 to 95% by weight of at least one thermoplastic methacrylate polymer D1 comprising at least one type of functional groups, selected from epoxy, carboxy, hydroxy, anhydride, and oxazoline, with
  d2) from 5 to 95% by weight of at least one thermoplastic polyester D2,
E) from 0 to 40% by weight of at least one filler E,
F) from 0 to 2% by weight of at least one organic acid F,
G) from 0 to 25% by weight of at least one halogen-free phosphorus compound G,
H) from 0 to 45% by weight of other additives H,
where the entirety of components A to H always gives 100%.

2. The molding composition according to claim 1, comprising
A) from 10 to 93% by weight of the at least one thermoplastic polyester A,
B) from 3 to 50% by weight of the at least one graft polymer B,
C) from 3 to 50% by weight of the at least one thermoplastic copolymer C,
D) from 1 to 30% by weight of the at least one copolymer D.

3. The molding composition according to claim 1, where the graft base B1 of the graft copolymer B is composed of
  b11) from 70 to 99.9% by weight of at least one alkyl acrylate B11 having from 1 to 8 carbon atoms in the alkyl radical,
  b12) from 0 to 30% by weight of another copolymerizable monoethylenically unsaturated monomer B12, or a mixture of these, and
  b13) from 0.1 to 5% by weight of a copolymerizable, polyfunctional monomer B13 that brings about crosslinking,
  where the entirety of B11, B12, and B13 gives 100% by weight.

4. The molding composition according to claim 1, where the copolymer C is composed of from 70 to 83% by weight of styrene and from 17 to 30% by weight of acrylonitrile.

5. The molding composition according to claim 1, where the methacrylate polymer D1 is composed of
  d11) from 80 to 99.9% by weight of methyl methacrylate D11,
  d12) from 0 to 19.9% by weight of at least other acrylate or methacrylate D12, and
  d13) from 0.1 to 10% by weight of at least one monomer D13, comprising at least one type of functional groups, selected from epoxy, carboxy, hydroxy, anhydride, and oxazoline,
  where the entirety of D11, D12, and D13 gives 100% by weight.

6. The molding composition according to claim 1, where glycidyl methacrylate, allyl glycidyl ether, isopropenyl glycidyl ether, or a mixture of these is used as monomer D13.

7. The molding composition according to claim 1, where the copolymer D is obtainable via melt compounding of the methacrylate polymer D1 with the polyester D2.

8. A method of using the thermoplastic molding compositions according to claim 1, comprising forming the thermoplastic molding compositions into moldings, fibers, and or foils.

9. A molding, a fiber, or a foil obtainable from the molding compositions according to claim 1.

10. The molding composition according to claim 2, where the graft base B1 of the graft copolymer B is composed of b11) from 70 to 99.9% by weight of at least one alkyl acrylate B11 having from 1 to 8 carbon atoms in the alkyl radical, b12) from 0 to 30% by weight of another copolymerizable monoethylenically unsaturated monomer B12, or a mixture of these, and b13) from 0.1 to 5% by weight of a copolymerizable, polyfunctional monomer B13 that brings about crosslinking, where the entirety of B11, B12, and B13 gives 100% by weight.

11. The molding composition according to claim 10, where the copolymer C is composed of from 70 to 83% by weight of styrene and from 17 to 30% by weight of acrylonitrile.

12. The molding composition according to claim 11, where the methacrylate polymer D1 is composed of d11) from 80 to 99.9% by weight of methyl methacrylate D11, d12) from 0 to 19.9% by weight of at least other acrylate or methacrylate D12, and d13) from 0.1 to 10% by weight of at least one monomer D13, comprising at least one type of functional groups, selected from epoxy, carboxy, hydroxy, anhydride, and oxazoline, where the entirety of D11, D12, and D13 gives 100% by weight.

13. The molding composition according to claim 12, where glycidyl methacrylate, allyl glycidyl ether, isopropenyl glycidyl ether, or a mixture of these is used as monomer D13.

14. The molding composition according to claim 13, where the copolymer D is obtainable via melt compounding of the methacrylate polymer D1 with the polyester D2.

15. A method of using the thermoplastic molding compositions according to claim 14, comprising forming the thermoplastic molding compositions into moldings, fibers, or foils.

16. A molding, a fiber, or a foil obtainable from the molding compositions according to claim 14.

17. The molding composition according to claim 4, where glycidyl methacrylate, allyl glycidyl ether, isopropenyl glycidyl ether, or a mixture of these is used as monomer D13.

18. The molding composition according to claim 5, where the copolymer D is obtainable via melt compounding of the methacrylate polymer D1 with the polyester D2.

19. The molding composition according to claim 6, where the copolymer D is obtainable via melt compounding of the methacrylate polymer D1 with the polyester D2.

20. A molding, a fiber, or a foil obtainable from the molding compositions according to claim 12.

* * * * *